United States Patent
Damle et al.

(10) Patent No.: US 9,307,477 B1
(45) Date of Patent: Apr. 5, 2016

(54) APPARATUS AND METHOD FOR INTERFACING WIRELESS CLIENT DEVICE TO MULTIPLE PACKET DATA NETWORKS

(71) Applicant: Marvell International Ltd., Hamilton (BM)

(72) Inventors: Ameya Damle, Santa Clara, CA (US); Stefano Faccin, Fremont, CA (US); Fan Zhao, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 176 days.

(21) Appl. No.: 14/095,512

(22) Filed: Dec. 3, 2013

Related U.S. Application Data

(63) Continuation of application No. 12/206,978, filed on Sep. 9, 2008, now Pat. No. 8,599,790.

(60) Provisional application No. 60/971,399, filed on Sep. 11, 2007.

(51) Int. Cl.
*H04W 4/00* (2009.01)
*H04W 40/02* (2009.01)

(52) U.S. Cl.
CPC ..................... *H04W 40/02* (2013.01)

(58) Field of Classification Search
CPC .............................. H04W 36/18; H04W 80/04
See application file for complete search history.

(56) References Cited

U.S. PATENT DOCUMENTS

2001/0046223 A1* 11/2001 Malki et al. ................... 370/338
2003/0193912 A1* 10/2003 O'Neill ......................... 370/331
2004/0165594 A1* 8/2004 Faccin et al. ............... 370/395.2
2008/0043614 A1* 2/2008 Soliman ....................... 370/208
2008/0175201 A1* 7/2008 Ahmavaara et al. ......... 370/331

OTHER PUBLICATIONS

RFC 3344; IP Mobility Support for IPv4; C. Perkins, Ed., Nokia Research Center; www.ietf.org/rfc/rfc3344.txt; Aug. 2002; 99 pages.
RFC 3775; Mobility Support in IPv6; D. Johnson, Rice University, C.Perkins, Nokia Research Center, J. Arkko, Ericsson; www.ietf.org/frc/rfc3775.txt; Jun. 2004; 165 pages.
Proxy Mobile IPv6; draft-ietf-netlmm-proxymip6-01.txt; S. Gundavelli, K. Leung, Cisco, V. Devarapalli, Azaire Networks, K. Chowdhury, Starent Networks, B. Patil, Nokia Siemens Networks; Jun. 18, 2007; 49 pages.

(Continued)

*Primary Examiner* — Hassan Kizou
*Assistant Examiner* — Abdelnabi Musa

(57) ABSTRACT

A networking device includes a tunneling module, a mobility agent module, and a wireless network interface that establishes a wireless link with a wireless client terminal. The tunneling module establishes first and second tunnels with first and second local mobility anchors, respectively. The first and second local mobility anchors are associated with first and second packet data networks, respectively. The mobility agent module stores a mapping of a plurality of addresses respectively assigned to local mobility anchors. The mapping maps a first address to the first local mobility anchor and a second address to the second local mobility anchor. In response to receiving a first packet from the wireless client terminal, the mobility agent module identifies, based on a source address of the first packet, a selected local mobility anchor from the mapping. The tunneling module tunnels the first packet from the networking device to the selected local mobility anchor.

23 Claims, 13 Drawing Sheets

(56) References Cited

OTHER PUBLICATIONS

RFC 2131; Dynamic Host Configuration Protocol; R. Droms, Bucknell University; Mar. 1997; 45 pages.

RFC 3315; Dynamic Host Configuration Protocol for IPv6 (DHCPv6); R. Droms, Ed., Cisco, J. Bound, Hewlett Packard, B. Volz, Ericsson, T. Lemon, Nominum, C. Perkins, Nokia Research Center, M. Carney, Sun Microsystems; Jul. 2003; 101 pages.

RFC 2464; IPv6 Stateless Stateless Address Autoconfiguration; S. Thomson, Bellcore, T. Narten, IBM; Dec. 1998; 25 pages.

RFC 2461; Neighbor Discovery for IP Version 6 (IPv6); T. Narten, IBM, E. Nordmark, Sun Microsystems, W. Simpson, Daydreamer; Dec. 1998; 93 pages.

Proxy Mobile IPv6 indication and discovery; draft-damic-netlmm-pmip6-ind-discover-01.txt; D. Damic, D. Premec, B. Patil, M. Sahasrabudhe, Nokia Siemens Networks; Jun. 19, 2007; 15 pages.

Proxy Mobile IPv6 indication and discovery; draft-damic-netlmm-pmip6-ind-discover-03.txt; D. Damic, D. Premec, B. Patil, M. Sahasrabudhe, Nokia Siemens Networks; Feb. 28, 2008; 17 pages.

\* cited by examiner

| Mobile Node | APN | LMA | PMIP Prefix |
|---|---|---|---|
| Terminal_ID | $APN_1$ | $LMA_1$ | Prefix 1 (if available) |
| | $APN_2$ | $LMA_2$ | Prefix 2 (if available) |
| | ... | | |
| ... | | | |

FIG. 11

| Terminal Address | LMA Address |
|---|---|
| Prefix 1 | Address 1 |
| Prefix 2 | Address 2 |
| ... | ... |

FIG. 12

Extended Router Solicitation

| |
|---|
| ... |
| $APN_1$ |
| $APN_2$ |
| ... |

FIG. 13A

Extended Router Advertisement

| |
|---|
| ... |
| PMIP Prefix 1 |
| PMIP Prefix 2 |
| Prefix Usage Indicator |
| ... |

FIG. 13B

Extended Router Advertisement

| |
|---|
| ... |
| PMIP Prefix |
| Prefix Usage Indicator |
| ... |

FIG. 13C

Extended DHCP Request

| |
|---|
| ... |
| $APN_1$ |
| $APN_2$ |
| ... |

FIG. 14A

Extended DHCP Reply

| |
|---|
| ... |
| PMIP Address 1 |
| PMIP Address 2 |
| Prefix Usage Indicator |
| ... |

FIG. 14B

Extended DHCP Reply

| |
|---|
| ... |
| PMIP Address |
| Prefix Usage Indicator |
| ... |

FIG. 14C

| APN | Service Identifiers |
|---|---|
| $APN_1$ | 8 (Push Email), 9 (Text Messaging) |
| $APN_2$ | 3 (VoIP) |
| $APN_3$ | 7 (Web Browsing) |

APPARATUS AND METHOD FOR INTERFACING WIRELESS CLIENT DEVICE TO MULTIPLE PACKET DATA NETWORKS

CROSS-REFERENCE TO RELATED APPLICATIONS

This is a continuation of U.S. patent Ser. No. 12/206,978 (now U.S. Pat. No. 8,599,790), filed on Sep. 9, 2008, which claims the benefit of U.S. Provisional Application No. 60/971,399, filed on Sep. 11, 2007. The entire disclosures of the above applications are incorporated herein by reference.

FIELD

The present disclosure relates to networks and more particularly to supporting multiple packet data networks within a framework of network-based mobility.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a functional block diagram of a wireless communications system is presented. A home network 102 receives packets from and sends packets to a distributed communications system 104, such as the Internet. A wireless terminal 106 wirelessly connects to the home network 102. For example only, the wireless terminal 106 may be a mobile phone, and the home network 102 may be the cellular network of a mobile phone operator.

The wireless terminal 106 is configured to work with the home network 102, and may be unable to connect to the networks of other carriers. In various implementations, the wireless terminal 106 may be able to view content from the distributed communications system 104 via the home network 102. The home network 102 may interconnect with the networks of other service providers and/or core networks.

Referring now to FIG. 2, a functional block diagram of a wireless communications system offering mobility is presented. The home network 102 is connected to one or more visited networks 110. For example only, FIG. 2 depicts three visited networks 110-1, 110-2, and 110-3. In various implementations, the visited networks 110 may be the networks of other service providers, including service providers in other countries.

A mobile wireless terminal 120 includes mobility features that allow the mobile wireless terminal 120 to communicate with the visited networks 110. For example, in FIG. 2, the mobile wireless terminal 120 has established a wireless connection to the visited network 110-1. The mobile wireless terminal 120 includes the code and data used to communicate with the home network 102 via the visited network 110-1. In this way, the mobile wireless terminal 120 can interface with the home network 102 even when connected to one of the visited networks 110. Because the mobile wireless terminal 120 itself includes mobility features, the mobile wireless terminal 120 may be described as supporting client mobile internet protocol (CMIP).

For example, mobile internet protocol (IP) for IP version 6 (IPv6) is described in request for comment (RFC) 3775, titled "Mobility Support in IPv6," the disclosure of which is hereby incorporated by reference in its entirety. Mobile IP for IP version 4 (IPv4) is described in RFC 3344, entitled "IP Mobility Support for IPv4," the disclosure of which is hereby incorporated by reference in its entirety.

Referring now to FIG. 3, a functional block diagram depicts a wireless communications system that provides proxy mobility to the wireless terminal 106. A home network 150 communicates with visited networks 160-1, 160-2, and 160-3. The visited networks 160 provide transparent mobility to wireless terminals, such as the wireless terminal 106, which do not include mobility functionality. This may be referred to as proxy mobile IP (PMIP) or network mobile IP. Proxy mobility in IPv6 is described in an Internet Engineering Task Force (IETF) draft titled "Proxy Mobile IPv6" (published Jun. 18, 2007 and available as "draft-ietf-netlmm-proxymip6-01.txt"), the disclosure of which is hereby incorporated by reference in its entirety.

When the wireless terminal 106 attempts to establish a link with the visited network 160-1, the visited network 160-1 determines a network (e.g., a home network) to which the wireless terminal 106 belongs. In this case, the visited network 160-1 determines that the home network 150 is the appropriate network. The visited network 160-1 then forwards packets from the wireless terminal 106 to the home network 150 and passes packets from the home network 150 to the wireless terminal 106. The wireless terminal 106 can therefore be oblivious to the fact that the wireless terminal 106 is connected to the visited network 160-1 instead of to the home network 150.

Referring now to FIG. 4, a functional block diagram and timeline of an implementation of client mobility is presented. The home network 102 includes a home agent (HA) 180. The HA 180 establishes the logical location of the mobile wireless terminal 120. Packets ultimately destined for the mobile wireless terminal 120 are sent to the HA 180, while packets from the mobile wireless terminal 120 will appear to originate from the location of the HA 180.

The mobile wireless terminal 120 may establish a connection to an access router (AR) 182 within the visited network 110-1. In various implementations, additional ARs (not shown) may be present. The AR 182 may communicate with other networks, including the home network 102.

When the mobile wireless terminal 120 connects to the visited network 110-1, the mobile wireless terminal 120 performs authentication and authorization with the AR 182. This may include communicating with an authentication, authorization, and accounting (AAA) server. The AAA server may retrieve information based on an identifier of the mobile wireless terminal 120, such as a network address identifier, that uniquely identifies the mobile wireless terminal 120. The AAA server may indicate to the AR 182 whether the mobile wireless terminal 120 should be allowed access to the home network 102 and what services should be provided to the wireless terminal 120.

The mobile wireless terminal 120 receives a local address from the AR 182. Using this address, the mobile wireless terminal 120 can communicate with various network elements, including the HA 180. The mobile wireless terminal 120 transmits a binding update message to the HA 180. The HA 180 allocates a global home address HoA to the mobile wireless terminal 120. The HA 180 may create a binding cache entry that records information about the mobile wireless terminal 120, such as the current address of the mobile wireless terminal 120 and the allocated address HoA.

The HA 180 transmits a binding acknowledgement message to the mobile wireless terminal 120. The binding acknowledgement message includes the HoA so that the mobile wireless terminal 120 is aware of its global home address. Packets sent from other network devices, such as other wireless terminals, are sent to that home address. The HA 180 receives those packets and forwards them to the mobile wireless terminal 120. Similarly, packets from the mobile wireless terminal 120 are first sent to the HA 180. The HA 180 then forwards the packets with a source address of HoA. To allow for packets to be exchanged between the mobile wireless terminal 120 and the HA 180, a tunnel is established between the mobile wireless terminal 120 and the HA 180.

Referring now to FIG. 5, a functional block diagram and timeline of an implementation of proxy mobility is presented. The wireless terminal 106 may establish a connection to a media access gateway (MAG) 190 in the visited network 160-1. In various implementations, additional MAGs (not shown) may be present in the visited network 160-1. The MAG 190 may communicate with other networks, including the home network 150.

Once the wireless terminal 106 connects to the MAG 190, the MAG 190 may authenticate the wireless terminal 106 and determine what services the wireless terminal 106 is authorized to access. The wireless terminal 106 then requests an address from the MAG 190. The MAG 190 determines a local mobility anchor (LMA) to which the wireless terminal 106 belongs. For example only, the MAG 190 may consult a home subscriber server (HSS) to determine the appropriate LMA.

The MAG 190 then sends a proxy binding update identifying the wireless terminal 106 to the identified LMA, which in this case is LMA 192, located in the home network 150. The LMA 192 allocates a home address HoA for the wireless terminal 106. The LMA 192 may also create a binding cache entry to record information about the wireless terminal 106. The LMA 192 sends a proxy binding acknowledgement including HoA to the MAG 190.

The MAG 190 and the LMA 192 establish a tunnel for transfer of packets to and from the wireless terminal 106. The MAG 190 then assigns HoA to the wireless terminal 106. When the wireless terminal 106 transmits a packet, the MAG 190 sends that packet through the tunnel to the LMA 192. The LMA 192 then forwards the packet with a source address of HoA. When a packet arrives at the LMA 192 with a destination address of HoA, the LMA 192 sends the packet to the MAG 190 through the tunnel. The MAG 190 then forwards the packets to the wireless terminal 106.

Using this architecture, the wireless terminal 106 can be unaware of the mobility services provided by the MAG 190. As expected, the wireless terminal 106 has been assigned a home address in the home network 150. The wireless terminal 106 therefore does not need to be aware that it is actually connected to the visited network 160-1 instead of to the home network 150.

Referring now to FIGS. 6-8, exemplary message flow diagrams are presented for various methods of obtaining a layer 3 address (e.g., an IP address). In FIG. 6, an example of dynamic host configuration protocol (DHCP) is shown. DHCP may be used to obtain an IPv4 address or an IPv6 address. DHCP for IPv4 is described in RFC 2131, titled "Dynamic Host Configuration Protocol," the disclosure of which is hereby incorporated by reference in its entirety. DHCP for IPv6 is described in RFC 3315, titled "Dynamic Host Configuration Protocol for IPv6 (DHCPv6)," the disclosure of which is hereby incorporated by reference in its entirety.

After a wireless terminal establishes layer 2 connectivity with an access router, the wireless terminal may broadcast a DHCP request. The access router can then provide the wireless terminal with an IP address via a DHCP reply. In various implementations, a two-stage process may be performed, where two requests and two replies are sent and received. The initial request may be a discovery message and the initial reply may be an offer message of an IP address. A subsequent request indicates an acceptance of the offer of the IP address and a subsequent reply indicates that the access router acknowledges the request. This subsequent reply may provide additional configuration information, such as domain name server (DNS) addresses.

Referring now to FIG. 7, a timeline depicts exemplary stateless IP address autoconfiguration. Stateless autoconfiguration for IPv6 is described in RFC 2462, titled "IPv6 Stateless Autoconfiguration," the disclosure of which is hereby incorporated by reference in its entirety. After the wireless terminal establishes layer 2 connectivity with an access router, the wireless terminal broadcasts a router solicitation message. The access router can then respond with a router advertisement, which includes an address prefix. The address prefix may be local to the access router's network or may be globally routable.

The wireless terminal configures a full IPv6 address based on the provided address prefix. For example only, a provided address prefix may be a 64-bit value, and the wireless terminal creates a 128-bit IPv6 address using the address prefix and a 64-bit value based on an interface identifier of the wireless terminal. For example only, the interface identifier may include a media access control (MAC) address.

The wireless terminal may then verify that the created IP address is unique, at least within the access router's network. The wireless terminal may determine uniqueness of a created IP address by broadcasting a neighbor discovery message that includes the created IP address. If no neighbors respond, the wireless terminal assumes that no other network node is using the created IP address. Neighbor discovery is described in RFC 2461, titled "Neighbor Discovery for IP version 6 (IPv6)," the disclosure of which is hereby incorporated by reference in its entirety.

Referring now to FIG. 8, an exemplary message diagram depicts a scenario where the wireless terminal attempts to use stateless address autoconfiguration but the access router requires the use of DHCP. After layer 2 connectivity is established, the wireless terminal broadcasts a router solicitation message. The access router responds with a router advertisement message indicating that DHCP is required. For example only, this may be indicated by setting an 'M' flag or an 'O' flag in the router advertisement message. In order to obtain a layer 3 address, the wireless terminal responds by broadcasting a DHCP request. The access router can then assign an IP address to the wireless terminal and provide that IP address to the wireless terminal in a DHCP reply.

SUMMARY

A media access gateway comprises a wireless network interface, a tunneling module, and a proxy mobility agent module. The wireless network interface establishes a wireless link with a wireless terminal. The tunneling module establishes a tunnel with a first local mobility anchor associated with a packet data network. The proxy mobility agent module stores a mapping of assigned addresses to local mobility anchor identifiers. The mapping includes an entry that maps a first assigned address to a local mobility anchor identifier of the first local mobility anchor. When a packet is received from the wireless terminal having a source address matching the first assigned address, the tunneling module tunnels the packet to the first local mobility anchor based on the entry.

In other features, when a second packet is received from the first local mobility anchor, the tunneling module forwards the second packet to the wireless terminal. The media access gateway further comprises an address assignment module that transmits an address assignment message to the wireless terminal. The address assignment message includes the first assigned address and a prefix usage indicator. The first assigned address comprises a network-based mobility address when the prefix usage indicator has a first state. The first assigned address comprises a client-based mobility address when the prefix usage indicator has a second state.

In further features, the first assigned address comprises at least one of an internet protocol address and an internet protocol address prefix. The address assignment module sets the prefix usage indicator to the second state when the first assigned address was generated based on a handoff. The media access gateway further comprises an address assignment module that transmits an address assignment message to the wireless terminal. The address assignment message includes a prefix usage indicator and a plurality of addresses including the first assigned address. The plurality of addresses includes N network-based mobility addresses and M client-based mobility addresses, wherein N and M are integers. The prefix usage indicator is based on N and M.

In still other features, the prefix usage indicator identifies the N network-based mobility addresses among the plurality of addresses and the M client-based mobility addresses among the plurality of addresses. A communications system comprises the media access gateway and the wireless terminal. The wireless terminal uses the first assigned address as a source address to send packets to the packet data network. The mapping includes an entry that maps a second assigned address to an identifier of a second local mobility anchor associated with a second packet data network. The wireless terminal uses the second assigned address as a source address to send packets to the second packet data network.

A wireless terminal comprises a wireless network interface and an address determination module. The wireless network interface establishes a wireless link with a media access gateway that supports network-based mobility. The address determination module receives network-based mobility address information from the media access gateway and assigns a plurality of home addresses to the wireless network interface. Each of the plurality of home addresses corresponds to one of a plurality of packet data networks. The wireless network interface transmits a packet destined for a first one of the plurality of packet data networks to the media access gateway. The packet has a source address set to a corresponding one of the plurality of home addresses.

In other features, the address determination module receives an address assignment message that includes a first assigned address and a prefix usage indicator. The address determination module initiates client-based mobility when the prefix usage indicator indicates that the first assigned address resulted from a handoff.

In further features, the address determination module determines one of the plurality of home addresses based on the first assigned address when the prefix usage indicator indicates that the first assigned address is a network-based mobility address. A communications system comprises the wireless terminal and the media access gateway. The media access gateway establishes, for each of the plurality of packet data networks, a tunnel with a corresponding local mobility anchor.

A method comprises establishing a wireless link with a wireless terminal; establishing a tunnel with a first local mobility anchor associated with a packet data network; storing a mapping of assigned addresses to local mobility anchor identifiers, where the mapping includes an entry that maps a first assigned address to a local mobility anchor identifier of the first local mobility anchor; and when a packet is received from the wireless terminal having a source address matching the first assigned address, tunneling the packet to the first local mobility anchor based on the entry.

In other features, the method further comprises when a second packet is received from the first local mobility anchor, forwarding the second packet to the wireless terminal. The method further comprises transmitting an address assignment message to the wireless terminal. The address assignment message includes the first assigned address and a prefix usage indicator. The first assigned address comprises a network-based mobility address when the prefix usage indicator has a first state. The first assigned address comprises a client-based mobility address when the prefix usage indicator has a second state.

In further features, the first assigned address comprises at least one of an internet protocol address and an internet protocol address prefix. The method further comprises setting the prefix usage indicator to the second state when the first assigned address was generated based on a handoff. The method further comprises transmitting an address assignment message to the wireless terminal. The address assignment message includes a prefix usage indicator and a plurality of addresses including the first assigned address. The plurality of addresses includes N network-based mobility addresses and M client-based mobility addresses, wherein N and M are integers. The prefix usage indicator is based on N and M.

In still other features, the prefix usage indicator identifies the N network-based mobility addresses among the plurality of addresses and the M client-based mobility addresses among the plurality of addresses. The method further comprises using the first assigned address as a source address when sending packets to the packet data network. The mapping includes an entry that maps a second assigned address to an identifier of a second local mobility anchor associated with a second packet data network, and further comprises using the second assigned address as a source address when sending packets to the second packet data network.

A method comprises establishing a wireless link with a media access gateway that supports network-based mobility; receiving network-based mobility address information from the media access gateway; assigning a plurality of home addresses to the wireless network interface, where each of the plurality of home addresses corresponds to one of a plurality of packet data networks; and transmitting a packet destined for a first one of the plurality of packet data networks to the media access gateway. A source address of the packet is set to a corresponding one of the plurality of home addresses.

In other features, the method further comprises receiving an address assignment message that includes a first assigned address and a prefix usage indicator. The method further comprises initiating client-based mobility when the prefix usage indicator indicates that the first assigned address resulted from a handoff. The method further comprises determining one of the plurality of home addresses based on the first assigned address when the prefix usage indicator indicates that the first assigned address is a network-based mobility address. The method further comprises establishing, for each of the plurality of packet data networks, a tunnel with a corresponding local mobility anchor.

A media access gateway comprises wireless network interfacing means for establishing a wireless link with a wireless terminal; tunneling means for establishing a tunnel with a first local mobility anchor associated with a packet data network;

and proxy mobility agent means for storing a mapping of assigned addresses to local mobility anchor identifiers. The mapping includes an entry that maps a first assigned address to a local mobility anchor identifier of the first local mobility anchor. When a packet is received from the wireless terminal having a source address matching the first assigned address, the tunneling means tunnels the packet to the first local mobility anchor based on the entry.

In other features, when a second packet is received from the first local mobility anchor, the tunneling means forwards the second packet to the wireless terminal. The media access gateway further comprises address assignment means for transmitting an address assignment message to the wireless terminal. The address assignment message includes the first assigned address and a prefix usage indicator. The first assigned address comprises a network-based mobility address when the prefix usage indicator has a first state. The first assigned address comprises a client-based mobility address when the prefix usage indicator has a second state.

In further features, the first assigned address comprises at least one of an internet protocol address and an internet protocol address prefix. The address assignment means sets the prefix usage indicator to the second state when the first assigned address was generated based on a handoff. The media access gateway further comprises address assignment means for transmitting an address assignment message to the wireless terminal. The address assignment message includes a prefix usage indicator and a plurality of addresses including the first assigned address. The plurality of addresses includes N network-based mobility addresses and M client-based mobility addresses, wherein N and M are integers. The prefix usage indicator is based on N and M.

In still other features, the prefix usage indicator identifies the N network-based mobility addresses among the plurality of addresses and the M client-based mobility addresses among the plurality of addresses. A communications system comprises the media access gateway and the wireless terminal. The wireless terminal uses the first assigned address as a source address to send packets to the packet data network. The mapping includes an entry that maps a second assigned address to an identifier of a second local mobility anchor associated with a second packet data network. The wireless terminal uses the second assigned address as a source address to send packets to the second packet data network.

A wireless terminal comprises wireless network interfacing means for establishing a wireless link with a media access gateway that supports network-based mobility; and address determination means for receiving network-based mobility address information from the media access gateway and for assigning a plurality of home addresses to the wireless network interfacing means. Each of the plurality of home addresses corresponds to one of a plurality of packet data networks. The wireless network interfacing means transmits a packet destined for a first one of the plurality of packet data networks to the media access gateway. The packet has a source address set to a corresponding one of the plurality of home addresses.

In other features, the address determination means receives an address assignment message that includes a first assigned address and a prefix usage indicator. The address determination means initiates client-based mobility when the prefix usage indicator indicates that the first assigned address resulted from a handoff. In other features, the address determination means determines one of the plurality of home addresses based on the first assigned address when the prefix usage indicator indicates that the first assigned address is a network-based mobility address. A communications system comprises the wireless terminal and the media access gateway. The media access gateway establishes, for each of the plurality of packet data networks, a tunnel with a corresponding local mobility anchor.

In still other features, the systems and methods described above are implemented by a computer program executed by one or more processors. The computer program can reside on a computer readable medium such as but not limited to memory, nonvolatile data storage, and/or other suitable tangible storage mediums.

A computer program stored on a computer-readable medium for use by a processor comprises establishing a wireless link with a wireless terminal; establishing a tunnel with a first local mobility anchor associated with a packet data network; storing a mapping of assigned addresses to local mobility anchor identifiers, where the mapping includes an entry that maps a first assigned address to a local mobility anchor identifier of the first local mobility anchor; and when a packet is received from the wireless terminal having a source address matching the first assigned address, tunneling the packet to the first local mobility anchor based on the entry.

In other features, the method further comprises when a second packet is received from the first local mobility anchor, forwarding the second packet to the wireless terminal. The method further comprises transmitting an address assignment message to the wireless terminal. The address assignment message includes the first assigned address and a prefix usage indicator. The first assigned address comprises a network-based mobility address when the prefix usage indicator has a first state. The first assigned address comprises a client-based mobility address when the prefix usage indicator has a second state.

In further features, the first assigned address comprises at least one of an internet protocol address and an internet protocol address prefix. The method further comprises setting the prefix usage indicator to the second state when the first assigned address was generated based on a handoff. The method further comprises transmitting an address assignment message to the wireless terminal. The address assignment message includes a prefix usage indicator and a plurality of addresses including the first assigned address. The plurality of addresses includes N network-based mobility addresses and M client-based mobility addresses, wherein N and M are integers. The prefix usage indicator is based on N and M.

In still other features, the prefix usage indicator identifies the N network-based mobility addresses among the plurality of addresses and the M client-based mobility addresses among the plurality of addresses. The method further comprises using the first assigned address as a source address when sending packets to the packet data network. The mapping includes an entry that maps a second assigned address to an identifier of a second local mobility anchor associated with a second packet data network, and further comprises using the second assigned address as a source address when sending packets to the second packet data network.

A computer program stored on a computer-readable medium for use by a processor comprises establishing a wireless link with a media access gateway that supports network-based mobility; receiving network-based mobility address information from the media access gateway; assigning a plurality of home addresses to the wireless network interface, where each of the plurality of home addresses corresponds to one of a plurality of packet data networks; and transmitting a packet destined for a first one of the plurality of packet data networks to the media access gateway. A source address of the packet is set to a corresponding one of the plurality of home addresses.

In other features, the method further comprises receiving an address assignment message that includes a first assigned address and a prefix usage indicator. The method further comprises initiating client-based mobility when the prefix usage indicator indicates that the first assigned address resulted from a handoff. The method further comprises determining one of the plurality of home addresses based on the first assigned address when the prefix usage indicator indicates that the first assigned address is a network-based mobility address. The method further comprises establishing, for each of the plurality of packet data networks, a tunnel with a corresponding local mobility anchor.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 11 is an exemplary table of profile information, which stores access point name (APN) information for various wireless terminals according to the principles of the present disclosure;

FIG. 12 is an exemplary table of media access gateway bindings when multiple packet data networks are supported via PMIP according to the principles of the present disclosure;

FIGS. 13A-13C depict exemplary data structures used for transmitting APN and prefix usage information via stateless address autoconfiguration protocols according to the principles of the present disclosure;

FIGS. 14A-14C depict exemplary data structures used for transmitting APN and address usage information via stateful address configuration protocols according to the principles of the present disclosure;

DESCRIPTION

Figure 1:
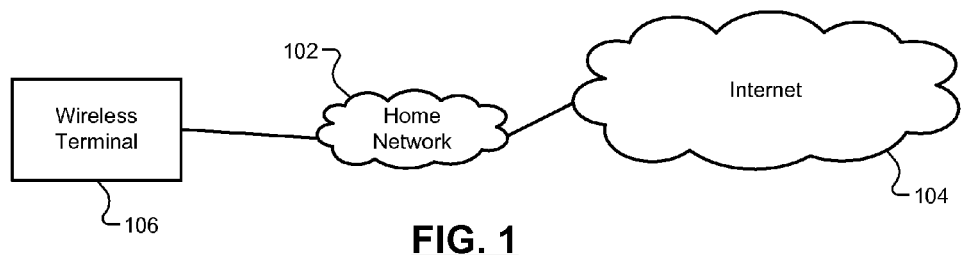
FIG. 1 is a functional block diagram of a wireless communications system according to the prior art.
Figure 2:
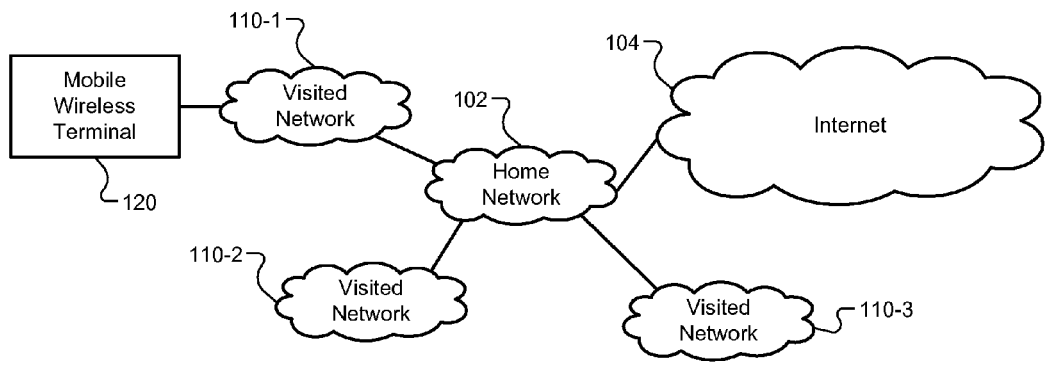
FIG. 2 is a functional block diagram of a wireless communications system offering mobility according to the prior art.
Figure 3:
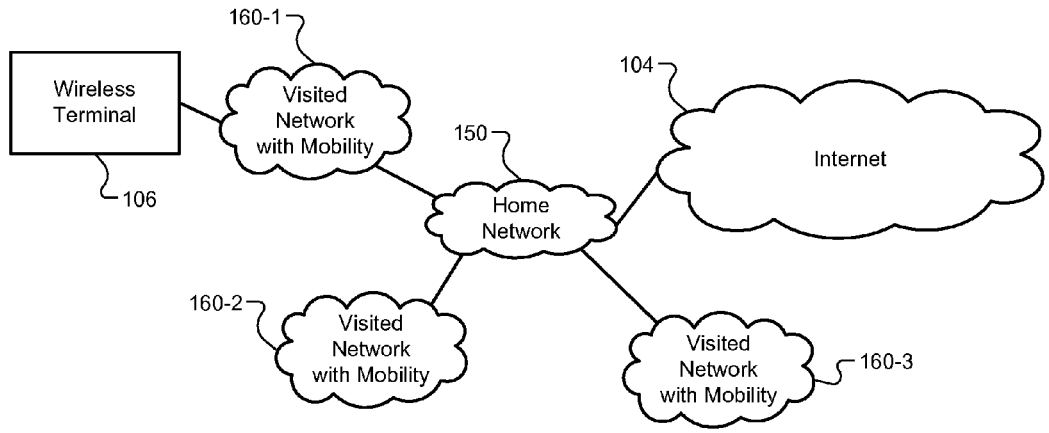
FIG. 3 is a functional block diagram of a wireless communications system according to the prior art that provides proxy mobility to a wireless terminal.
Figure 4:
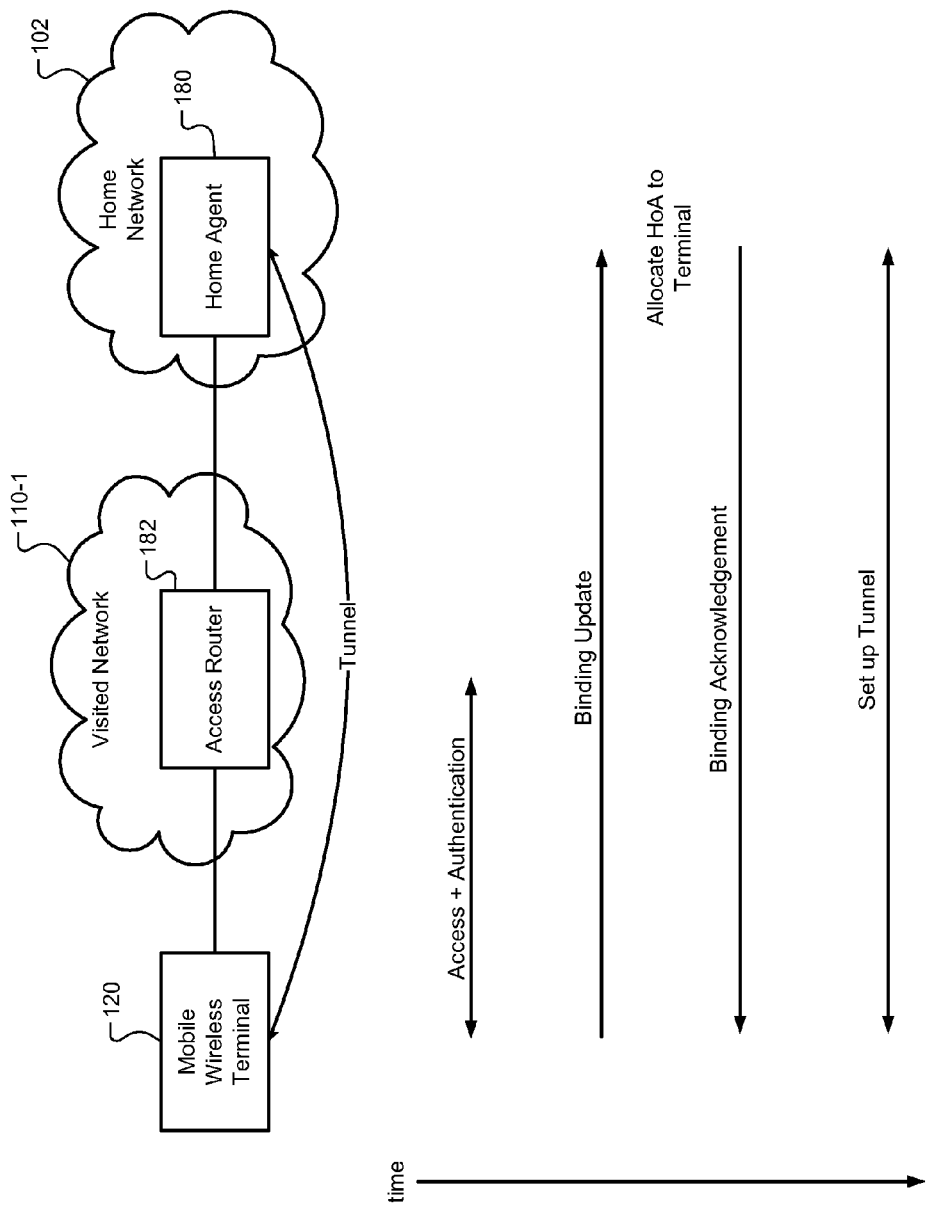
FIG. 4 is a functional block diagram and timeline of an implementation of client mobility according to the prior art.
Figure 5:
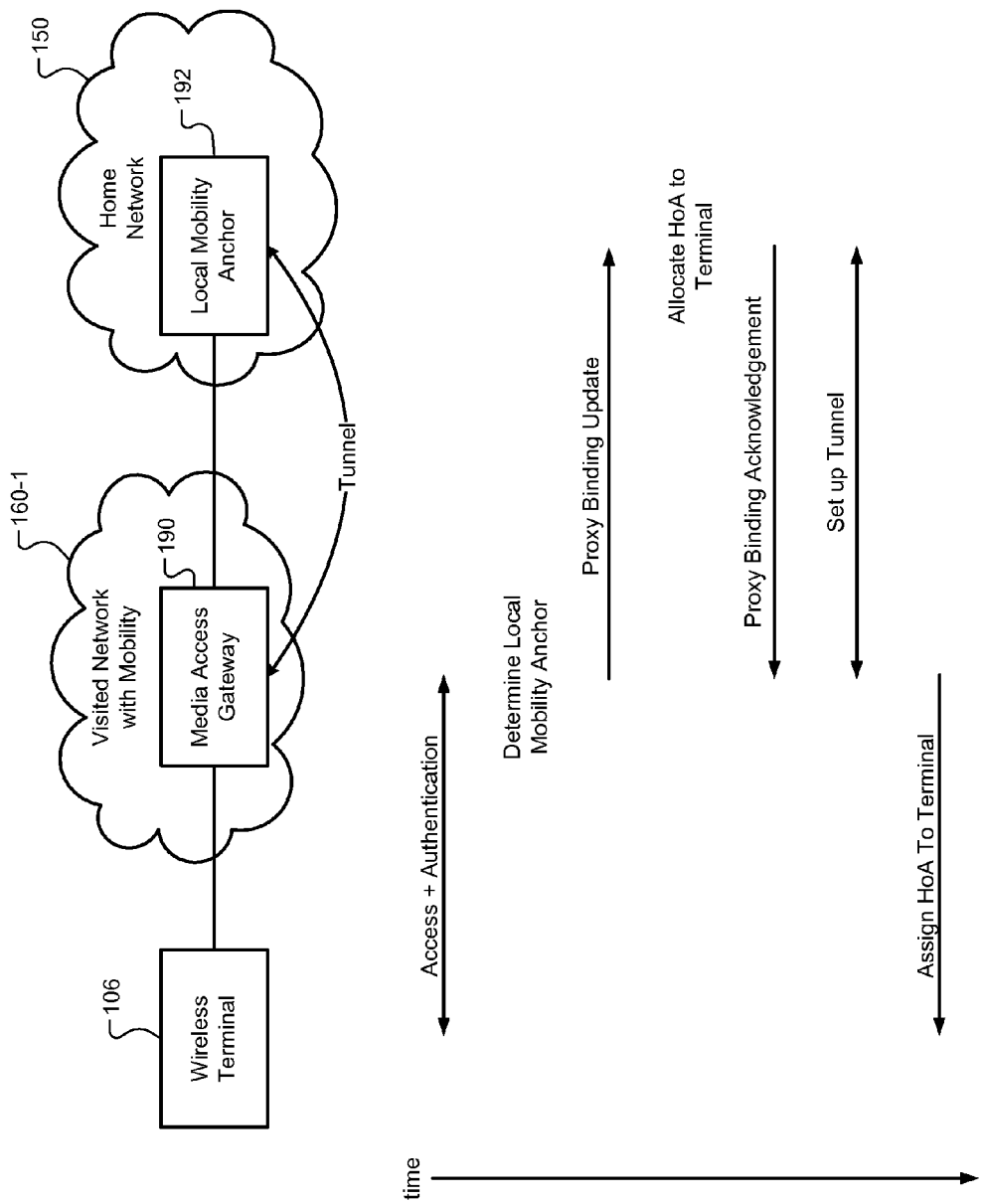
FIG. 5 is a functional block diagram and timeline of an implementation of proxy mobility according to the prior art.
Figure 6:
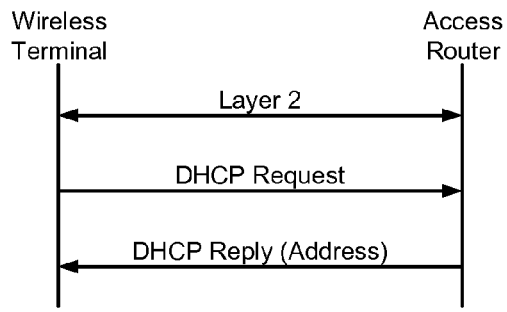
FIGS. 6-8 depict exemplary message flow diagrams for various methods of obtaining a layer 3 address according to the prior art.
Figure 7:
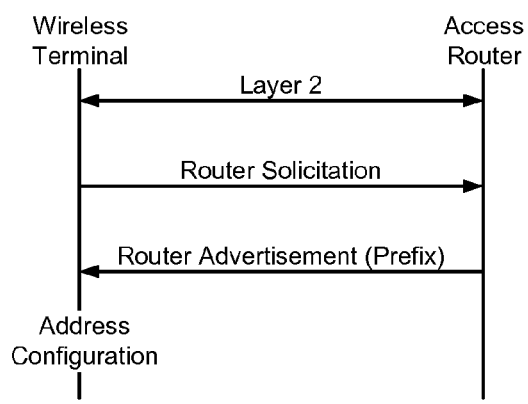
Figure 8:
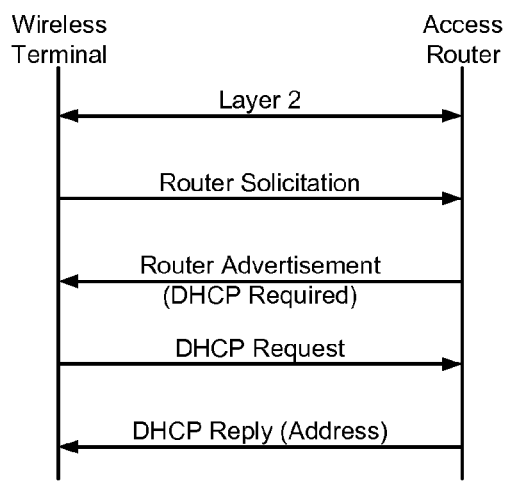

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 9:
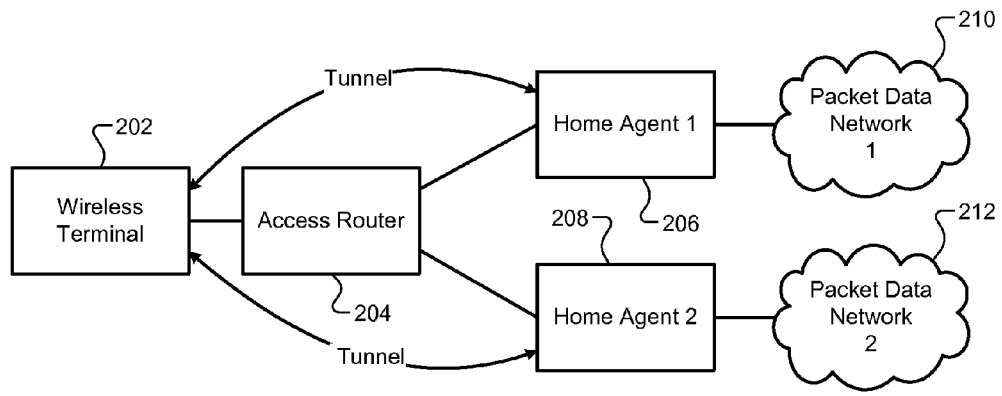
FIG. 9 is a functional block diagram of a wireless terminal using client mobile IP to connect to two home agents according to the principles of the present disclosure.

Referring now to FIG. 9, a functional block diagram of client-based mobile IP for accessing two packet data networks (PDNs) via one access router (AR) is presented. A wireless terminal 202 connects to an access router (AR) 204. The AR 204 provides the wireless terminal 202 with a care-of address (CoA). The wireless terminal 202 assigns the CoA to its network interface and can use the CoA to communicate with a first home agent (HA) 206 and a second HA 208.

The wireless terminal 202 may be preprogrammed with the addresses of the first and second HAs 206 and 208. Alternatively, the identities of the first and second HAs 206 and 208 may be determined from a profile for the wireless terminal 202. This profile may be stored remotely, such as in a home subscriber server (HSS) or an authentication, authorization, and accounting (AAA) server. The wireless terminal 202 may communicate with the first HA 206 in order to use services offered by the first packet data network (PDN) 210. The wireless terminal 202 may communicate with the second HA 208 in order to use services provided by a second PDN 212.

The wireless terminal 202 may retrieve, from storage local to the wireless terminal 202 or from remote storage, the address of an HA that will allow access to a PDN that provides a desired service. For example, if the first PDN 210 provides text messaging functionality, the wireless terminal 202 may retrieve the address of the first HA 206 when the wireless terminal 202 desires to perform text messaging.

The wireless terminal 202 creates tunnels to the first and second HAs 206 and 208. Each of the first and second HAs 206 and 208 assigns a different home address to the wireless terminal 202—for example only, HoA1 and HoA2. To send a packet to the first PDN 210, the wireless terminal 202 encapsulates the packet and sends the packet via the tunnel to the first HA 206. The encapsulated packet has a source address of CoA. The first HA 206 then decapsulates the packet and sends the packet to the PDN 210 with a source address of HoA1.

A node within the first PDN 210 receives the packet and may send a reply packet to HoA1. The reply packet therefore has a destination address of HoA1, which routes to the first HA 206. The first HA 206 retains bindings for attached wireless terminals, and can therefore recognize that HoA1 corresponds to the wireless terminal 202. The first HA 206 therefore encapsulates the reply packet and sends the encapsulated packet to the wireless terminal 202 via the tunnel.

The wireless terminal 202 sends packets to and receives packets from the second PDN 212 similarly. The packets are sent in encapsulated form to the second HA 208 with a source address of CoA, and are then sent out to the second PDN 212 with a source address of HoA2. Packets from the second PDN 212 with a destination of HoA2 are routed to the second HA 208. The second HA 208 passes these packets to the wireless terminal 202 via the tunnel.

Figure 10:
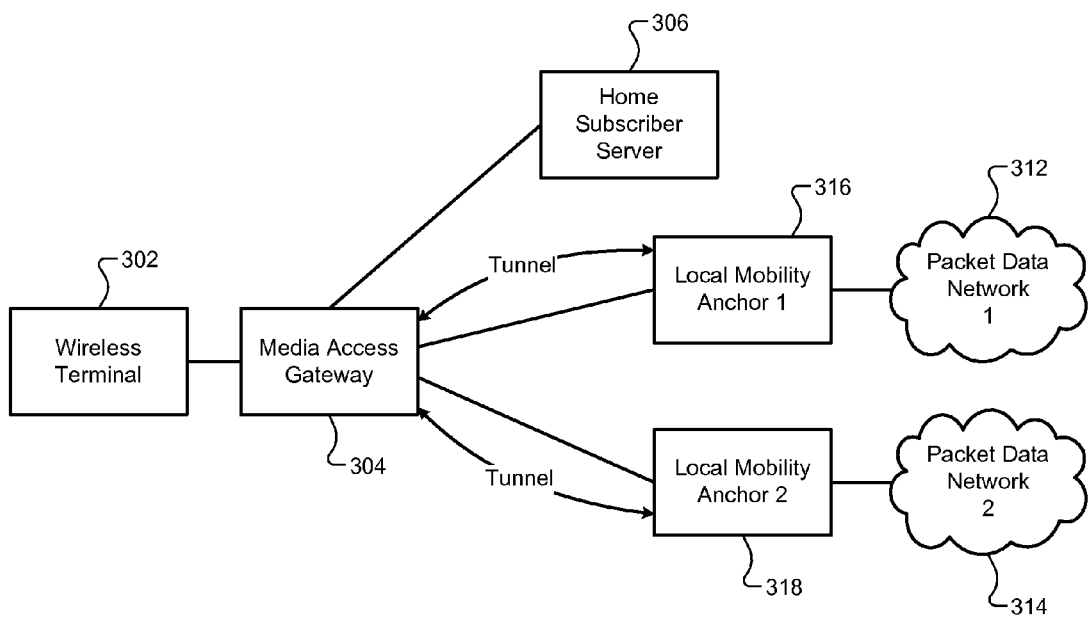
FIG. 10 is a functional block diagram of a wireless terminal using proxy mobile IP (PMIP) to connect to two home agents according to the principles of the present disclosure.

Referring now to FIG. 10, a functional block diagram of proxy mobility being used to access multiple PDNs is presented. A wireless terminal 302 connects to a media access gateway (MAG) 304. The wireless terminal 302 establishes layer 2 connectivity with the MAG 304. For example only, the layer 1 and layer 2 connectivity may include a third generation partnership project (3GPP) interface or a non-3GPP interface, such as Wi-Fi (IEEE 802.11). The wireless terminal 302 may then request a layer 3 address, such as an internet protocol (IP) address, which will be used herein for purposes of illustration only.

The wireless terminal 302 may request an IP address using any suitable protocol, such as dynamic host configuration protocol (DHCP) and/or stateless IP autoconfiguration, both described in detail above. In various implementations, the wireless terminal 302 may request an IP address using stateless IP autoconfiguration, and if informed that DHCP is required, switch to a DHCP address request.

Prior to requesting an IP address, the wireless terminal 302 and the MAG 304 may exchange information relating to their respective mobility mode capabilities and preferences. For example, the wireless terminal 302 may convey which mobility modes, such as CMIP or PMIP, the wireless terminal 302 supports and/or which mode is preferred. In addition, the MAG 304 may indicate which mobility modes are supported and/or which mobility modes are allowed for the wireless terminal 302. The wireless terminal 302 may select one of the available mobility modes and indicate this selection to the MAG 304.

For example only, these mobility preferences and capabilities may be included in address configuration messages to avoid defining new messages. In various implementations, address configuration messages are used to configure a layer 3 address when a node, like the wireless terminal 302, connects to a network. The mobility preferences and capabilities may be transmitted during address configuration or at other times.

Address configuration messages may include address request messages and address assignment messages. For example only, router solicitation and router advertisement messages may serve as address request and address assignment messages, respectively, when stateless address autoconfiguration is used. For example only, dynamic host configuration protocol (DHCP) messages may serve as address request and address assignment messages when stateful address configuration. DHCP solicit, discover, and request messages may serve as address request messages. DHCP reply, advertise, acknowledge, and offer messages may serve as address assignment messages.

For example only, extended address configuration messages for mobility mode information exchange are discussed in an Internet Engineering Task Force (IETF) draft titled "Proxy Mobile IPv6 indication and discovery" (published Jun. 19, 2007 and available as "draft-damic-netlmm-pmip6-ind-discover-01.txt"), the disclosure of which is hereby incorporated by reference in its entirety. An updated version of this draft was published Feb. 25, 2008 and is available as "draft-damic-netlmm-pmip6-ind-discover-03.txt", the disclosure of which is hereby incorporated by reference in its entirety If the wireless terminal 302 will be using CMIP, the MAG 304 may provide the wireless terminal 302 with a care-of address. The wireless terminal may then operate as shown in FIG. 9. If the wireless terminal 302 will be using PMIP, the MAG 304 may provide the wireless terminal 302 with one or more home addresses. The MAG 304 will then tunnel packets to local mobility anchors (LMAs) from the wireless terminal 302 based on which home address the wireless terminal 302 uses. An exemplary mapping used by the MAG 304 is shown in FIG. 12.

In various implementations, the MAG 304 may provide both a home address and a care-of address. The wireless terminal 302 then has the option of deciding whether to use PMIP or CMIP, or a combination of PMIP and CMIP. For example only, PMIP may be used to access one PDN, while CMIP is used to access another PDN.

The MAG 304 may access a profile associated with the wireless terminal 302. The profile may be stored in a home subscriber server (HSS) 306 or in an AAA server (not shown). An example of a partial profile entry of the HSS 306 is shown in FIG. 11. The profile may specify to which PDNs the wireless terminal 302 should be connected. The wireless terminal 302 may also provide information regarding with which PDNs the wireless terminal 302 desires to connect.

In various implementations, each PDN may be identified by an access point name (APN). The APN may be a logical name that resolves to a numeric or other identifier of a PDN, such as an IP address. If the wireless terminal 302 does not provide an indication of the desired APNs, the MAG 304 may initiate connections with one or more default APNs specified by the profile. For example only, various ones of the APNs listed in the profile may be designated as default APNs. Alternatively, all APNs in the profile may be considered default APNs.

When the wireless terminal 302 provides a set of APNs to which the wireless terminal 302 desires to connect, this set of APNs may be modified by the MAG 304. For example, local policies of the MAG and/or roaming agreements between the MAG and a home network of the wireless terminal 302 may restrict which APNs are available. In addition, the APNs specified by the wireless terminal 302 may be restricted to those listed in the profile of the wireless terminal 302. In other words, APNs specified by the wireless terminal 302 that are not listed in the profile of the wireless terminal 302 may be ignored.

The MAG 304 then begins to establish connections corresponding to each of the selected APNs. The profile may specify LMA addresses corresponding to each APN. Alternatively, the MAG 304 may resolve APNs into LMA addresses using a lookup table or a query, such as a domain name system (DNS) query. For example only, FIG. 10 depicts a scenario where the wireless terminal 302 will communicate with first and second PDNs 312 and 314, which are identified by $APN_1$ and $APN_2$, respectively.

$APN_1$ and $APN_2$ may be associated with addresses $LMA_1$ and $LMA_2$, respectively, for first and second LMAs 316 and 318. The MAG 304 provides home address information corresponding to the first LMA 316 to the wireless terminal 302. The address information may be a full address and/or may be an address prefix from which the wireless terminal 302 can generate a full address. For ease of explanation only, the word address will be used to indicate either a full address or a partial address, such as an address prefix.

The MAG 304 indicates to the wireless terminal 302 the PDN with which address that PDN is associated. For example only, the MAG 304 may send addresses in a specified order so the wireless terminal 302 can match the received addresses with PDNs. For example, this order may be based on the order that a list of APNs was provided to the MAG 304 by the wireless terminal 302. In various implementations, a single address may be sent to the wireless terminal 302 in response to a request for a single PDN from the wireless terminal 302. The wireless terminal 302 is therefore aware of the PDN to which this address corresponds.

The MAG 304 creates a tunnel to the first LMA 316 for exchanging packets between the wireless terminal 302 and the first PDN 312. Similarly, the MAG 304 establishes a tunnel to the second LMA 318 for exchanging packets between the wireless terminal 302 and the second PDN 314.

When the wireless terminal 302 sends packets using the address (as the source address) corresponding to the first PDN 312, the MAG 304 will tunnel the packets to the first LMA 316. The first LMA 316 then forwards these packets to the first PDN 312. The address corresponding to the first PDN will also be the destination address for packets sent from nodes in the first PDN 312 to the wireless terminal 302.

As described in more detail below, the MAG 304 may transmit addresses and identification of the associated APNs to the wireless terminal 302 using existing protocols. For example only, address configuration messages may be used to send addresses and to indicate to which PDN the addresses correspond.

As described in more detail below, the address corresponding to the first LMA 316 provided to the wireless terminal 302 may be obtained from the profile and/or may be received from the first LMA 316. In various implementations, the MAG 304 may initially provide the address stored in the profile, if available. If the MAG 304 receives a different (e.g., updated) address from the first LMA 316, the MAG 304 may provide this updated address to the wireless terminal 302.

Referring now to FIG. 11, a partial profile in a profile database is displayed. In various implementations, this profile database may be stored in an HSS or an AAA server. A first column includes an identifier of the mobile node, also known as a wireless terminal. The first profile in the profile database may correspond to a wireless terminal uniquely identified by terminal_ID. For purposes of illustration only, a portion of a single profile is shown, although multiple profiles may be present, as indicated by an ellipsis. The first profile includes multiple APNs, and each of the APNs denotes a PDN to which the wireless terminal can connect. Each APN may be associated with an LMA address. In addition, a home address may be stored for each APN.

A first home address (which may be in the form of a prefix) may correspond to the LMA address $LMA_1$, while a second home address may correspond to the LMA address $LMA_2$. If the home address is not stored in the profile, the MAG queries the appropriate LMA to determine the address. For example only, home addresses may be stored in the profile if the LMA has previously serviced the wireless terminal. Specifically, a home address may be available if a wireless terminal is handing off from one MAG to another MAG while using the same LMA. Even if the home address is available in the profile, the MAG may verify with the corresponding LMA to see if the home address is still valid. For purposes of illustration only, the profile shown in FIG. 11 lists two APNs, while an ellipsis indicates that other APNs may be present.

Referring now to FIG. 12, an exemplary table for a MAG including multiple bindings is shown. A first column of the table includes home addresses assigned to the attached wireless terminal, which may take the form of address prefixes. A second column of the table includes addresses of LMAs corresponding to the terminal addresses. The MAG creates an entry in the table for each home address assigned to the wireless terminal.

When the MAG receives a packet from the wireless terminal having a source address that matches an entry in the table, the packet is encapsulated and sent to the LMA indicated by the corresponding LMA address. For example only, the match may be performed across the entire address. Alternatively, a mask may be applied so that any address having the same prefix as a prefix stored in a table entry will be considered a match.

Encapsulated packets received from the LMAs are decapsulated and sent to the wireless terminal. The destination address of the decapsulated packet should match the home address corresponding to the LMA from which the encapsulated packet was received. When the MAG receives a packet from the wireless terminal having a different source address, such as a care-of address, the MAG may simply route the packet toward its destination. These packets may be used in performing communication using client mobile IP.

Referring now to FIGS. 13A-14C, exemplary data structures for transmitting APN information in address configuration messages are shown. In FIG. 13A, an extended router solicitation message is shown. The router solicitation message, which may be used as part of stateless address autoconfiguration, can be extended to include a list of APNs.

A wireless terminal may therefore transmit one or more desired APNs in the extended router solicitation message. A MAG that is capable of interpreting the extended router solicitation message may retrieve this list of APNs. Less capable MAGs may ignore the extended information in the extended router solicitation message. The MAG may modify the list of APNs and begin establishing tunnels with LMAs associated with those APNs. APN information may be included in a previously-defined or new field of a previously-defined or new option of a router solicitation message.

FIG. 13B depicts a router advertisement message that is extended to include multiple addresses. APN information associated with the addresses may be included in a previously-defined or new field of a previously-defined or new option of a router advertisement message. For example only, APNs and associated PMIP address prefixes may be included in an alternating list (not shown), where each address prefix corresponds to the preceding APN. A MAG can transmit home address prefixes for each LMA to the wireless terminal using such an extended router advertisement message.

Various other mechanisms for signaling APN information to the wireless terminal can be used. For example only, the order of APNs sent in an extended router solicitation message, such as that shown in FIG. 13A, may be recorded by the MAG. The MAG may then provide prefixes corresponding to the APNs in a router advertisement message in the same order. The wireless terminal therefore knows which prefix applies to which APN based on the order of the received prefixes. For requested APNs for which the MAG cannot or will not provide an address prefix, the place of the address prefix may be held by a known value, such as zero.

When the extended router advertisement does not include APN information, the wireless terminal may not be able to identify each of multiple address prefixes received in the extended router advertisement. For example, when multiple address prefixes are present, each address prefix may be a home address prefix, that corresponds to a different PDN. Alternatively, each address prefix may be a different care-of address prefix for use according to CMIP. Further, multiple address prefixes may include both one or more home address prefixes and one or more care-of address prefixes.

The extended router advertisement may therefore include an address prefix usage indicator (PUI) that indicates the nature of the address prefixes. For example only, the PUI may include a series of flags, one corresponding to each of the address prefixes. The flags may indicate whether an address prefix corresponds to a home address or a care-of address. As another example, the home addresses may be contiguous and at a fixed location (such as the beginning or end) of the list of addresses. The PUI may then indicate the number of home addresses, and the remaining addresses are assumed to be care-of addresses.

Alternatively, and for example only, setting a single flag may indicate that all included address prefixes correspond to home addresses. When the single flag is not set, the first address prefix corresponds to a home address while the remaining address prefixes correspond to care-of addresses. Based on the PUI, the wireless terminal can configure each address prefix corresponding to a home address so that the PDNs corresponding to those address prefixes can be accessed via PMIP.

If the extended router advertisement includes APN information, the wireless terminal may assume that an address prefix identified by an APN can be configured as part of a home address for that APN. Even for address configuration messages including APN information, however, the PUI may be used to convey additional information.

For example only, assume that the wireless terminal has configured a home address for a first PDN based on a first received address prefix. If the wireless terminal receives a new address prefix for that first PDN, the wireless terminal may be unaware of whether this new address prefix is the result of a handoff between MAGs or simply the result of an administrative change. For example, the MAG may have sent the first received address prefix based on a profile entry and the MAG then sent the new address prefix once the MAG receives a proxy binding acknowledgement. Alternatively, the new address prefix may be sent as part of address management by the LMA.

If the new prefix is the result of an administrative change, the wireless terminal may reconfigure the home address for the first PDN based on the new address prefix. Session continuity may be terminated when such a new home address is configured. By contrast, if the new address prefix is the result of a handoff, the wireless terminal may desire to switch to CMIP. The wireless terminal may use a care-of address from the new MAG to communicate with an LMA (or HA) that provides access to the first PDN.

Session continuity may be maintained if the wireless terminal establishes a CMIP tunnel with the HA, and retains the same home address, which was visible to the first PDN. The hosts in the first PDN may be unaware that the wireless terminal is now using CMIP instead of PMIP because the home address has remained the same.

The PUI may therefore specify whether address prefixes included in the extended router advertisement are the result of a handoff. The PUI may serve a similar function when a single address prefix is included in the extended router advertisement, as shown in FIG. 13C.

Referring now to FIGS. 14A-14C, similar information may be conveyed in extended DHCP messages. In FIG. 14A, an extended DHCP request depicts including multiple APNs. In FIGS. 14A-14B, extended DHCP replies may include a PUI. When using DHCP, the MAG may generate full IP addresses based on address prefixes from the profile and from LMAs. The DHCP replies may therefore include full IP addresses instead of address prefixes. Information indicated by the PUI, such as whether the address is the result of a handoff and whether the address is a home address, applies to full IP addresses as well as to address prefixes.

Figure 15A:
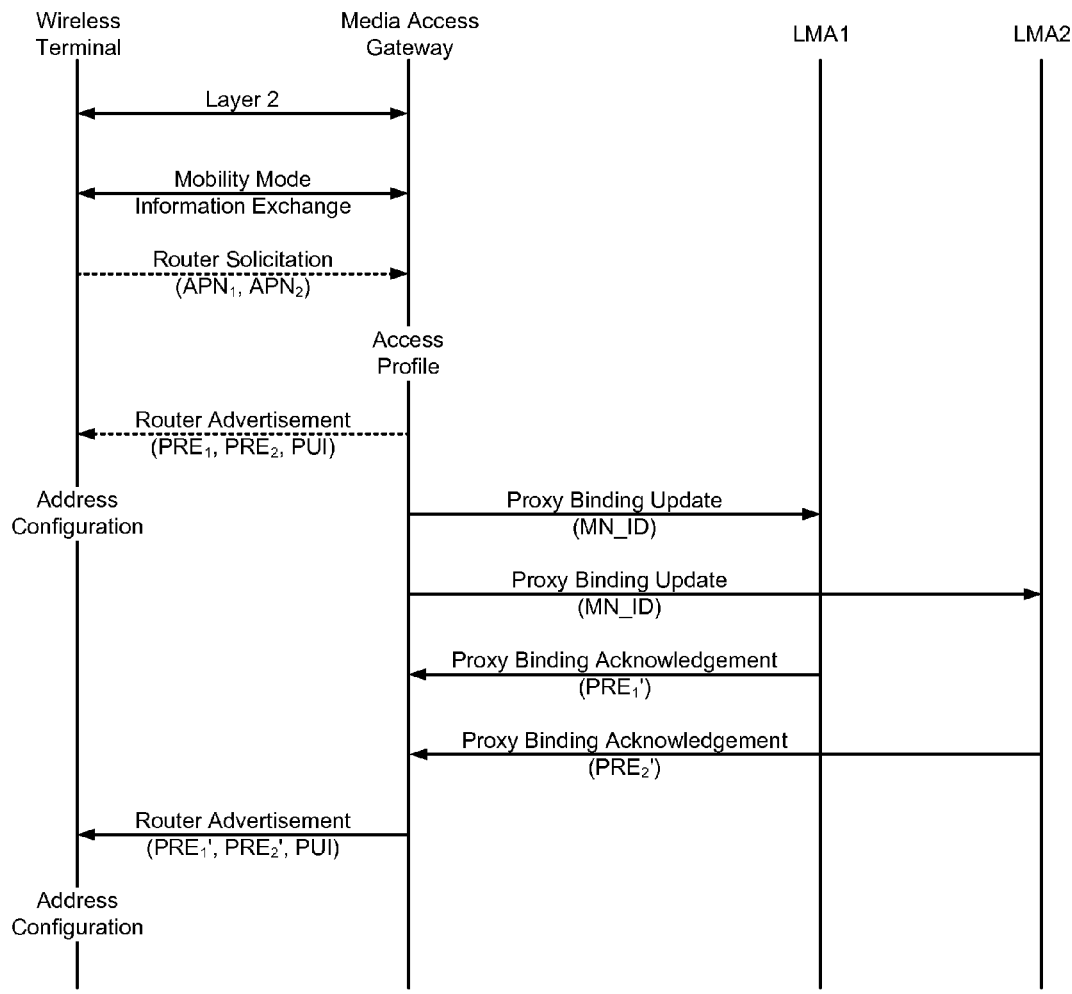
FIGS. 15A-15B are message flow diagrams depicting exemplary methods of transmitting APN information via stateless address autoconfiguration according to the principles of the present disclosure.

Referring now to FIG. 15A, an exemplary message flow diagram is presented. The Y-axis represents time, with time increasing in the downward direction. The wireless terminal first establishes layer 2 connectivity with the MAG. The wireless terminal may then exchange mobility mode information with the MAG. For purposes of illustration only, the following discussion assumes that the wireless terminal selected PMIP as the desired mobility mode.

The wireless terminal may then broadcast a router solicitation message specifying the APNs to which the wireless terminal is interested in connecting. For example only, the wireless terminal may indicate that the wireless terminal is interested in connecting to the PDNs specified by $APN_1$ and $APN_2$. For example only, first and second LMAs interface with first and second PDNs, respectively, which have APNs of $APN_1$ and $APN_2$, respectively.

The MAG accesses the profile of the wireless terminal. The profile may include APN information and corresponding LMA addresses. Based on the profile and/or the router solicitation message, a group of one or more PDNs is selected. In various implementations, the MAG may not receive a router solicitation message, and the group of PDNs selected may be a default group. The wireless terminal may be preprogrammed to know this default group of PDNs as well as the order of the PDNs within the group.

If addresses corresponding to one or more of the selected group of PDNs are stored in the profile, the MAG may send a router advertisement to the wireless terminal including the addresses obtained from the profile. The router advertisement may also include a PUI. As the wireless terminal configures its network interface based on these addresses, the MAG initiates communication with LMAs associated with the selected group of PDNs. In this example, the MAG sends proxy binding updates to the first and second LMAs.

The proxy binding updates include the identity of the wireless terminal. For example, an identification code of the wireless terminal, such as a mobile node identifier (MN_ID) may be included. Alternatively, address information from the profile of the wireless terminal may be provided. For example, an address prefix stored for the wireless terminal may be included. Address prefixes may be uniquely assigned to the wireless terminal and therefore provide a unique identification of the wireless terminal.

The first and second LMAs may create binding cache entries to track the current location and status of the wireless terminal. The first and second LMAs then send proxy binding acknowledgements to the MAG. Each proxy binding acknowledgement may include address information that is the same as or different than that sent in the proxy binding update. For example, the address prefix retrieved from the profile may be outdated. In addition, the LMAs may desire to provide different address prefixes than were previously stored in the profile. The proxy binding acknowledgements may therefore include, for example only, new address prefixes $PRE_1'$ and $PRE_2'$.

Once the MAG receives the proxy binding acknowledgements, the MAG provides the received address prefixes $PRE_1'$ and $PRE_2'$ to the wireless terminal in a router advertisement message. A PUI may indicate that the new address prefixes are simply replacements for the previously sent address prefixes. The PUI may also indicate that the included address prefixes are home address prefixes for PMIP. The MAG may also signal which address prefix corresponds to which APN. The wireless terminal then configures home addresses for its network interface corresponding to each of the received address prefixes.

In various implementations, the MAG may provide a router advertisement message to the wireless terminal as soon as the first proxy binding acknowledgement is received. Address information from later proxy binding acknowledgements can be sent in additional router advertisement messages. For purposes of illustration only, the proxy binding acknowledgement from the first LMA is shown being received first, although the proxy binding acknowledgements may arrive in any order.

The MAG retains a binding between the assigned home address prefixes and the corresponding LMAs, such as is shown in FIG. 12. In some cases, the proxy binding acknowledgements may indicate that the address prefixes stored in the profile were correct. If the MAG had transmitted a router advertisement including the address prefixes stored in the profile, the wireless terminal may have already configured its network interface correctly and begun sending packets. The MAG may hold any such packets until the proxy binding acknowledgements indicate that the provided address prefixes are correct, however.

If the proxy binding acknowledgements indicate that one or more of the address prefixes provided to the wireless terminal has been updated, held packets including the outdated address prefix may be dropped. Packets will be forwarded once the wireless terminal reconfigures its network interface using the new updated address prefix.

Figure 15B:
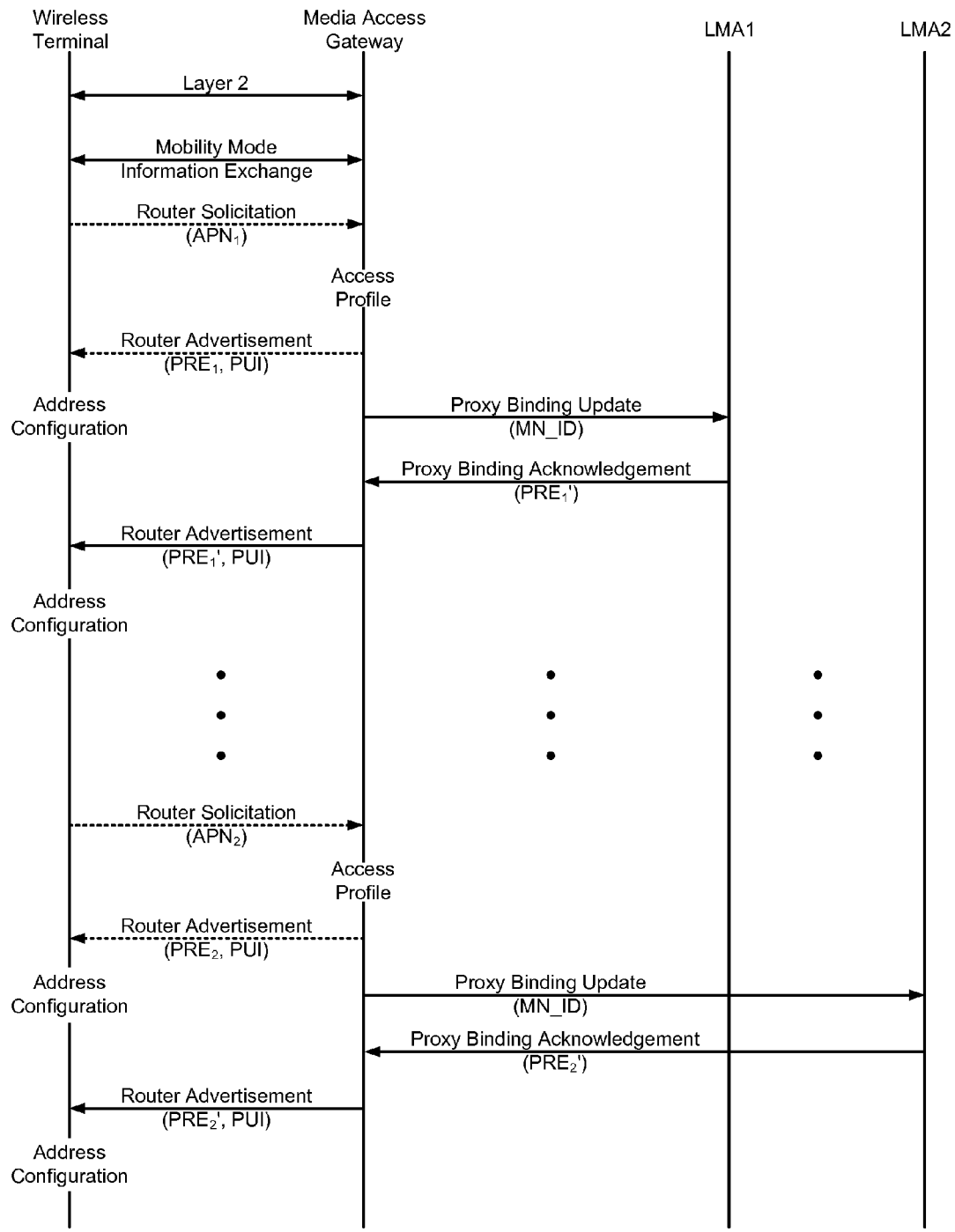

Referring now to FIG. 15B, PMIP connections to multiple PDNs may be requested and/or provided sequentially. After mobility mode information exchange, the wireless terminal may broadcast a router solicitation message including a first APN, $APN_1$. The MAG accesses a profile corresponding to the wireless terminal. If an address prefix corresponding to $APN_1$ is available in the profile, the MAG may transmit a router advertisement to the wireless terminal including that address prefix. The router advertisement message may also include a PUI.

If the MAG does not receive a router solicitation message including APN information, the profile may include one or more default APNs assigned to the wireless terminal. If an address prefix is stored in the profile for that default APN, the address prefix may be provided in the router advertisement message.

The MAG then sends a proxy binding update to a first LMA corresponding to the selected PDN, $LMA_1$. This proxy binding update may include a unique identifier of the wireless terminal, such as MN_ID. Meanwhile, the wireless terminal may configure its network interface based on the address prefix received in the router advertisement message.

When the MAG receives a proxy binding acknowledgment from $LMA_1$, the MAG may transmit a router advertisement message to the wireless terminal. The router advertisement includes a prefix received from $LMA_1$. If the correct address prefix received from $LMA_1$ was already transmitted in a previous router advertisement, this router advertisement can be omitted. The wireless terminal then configures network interface based upon this newly received address prefix.

In various implementations, the wireless terminal may wait to configure its network interface until the second router advertisement is received or after a predetermined period of time. In this way, the wireless terminal will not have to reconfigure its network interface if an updated address prefix is received. The wireless terminal then uses the home address based on the received address prefix ($PRE_1'$) to communicate with the MAG. Packets sent to the MAG with a home address based on $PRE_1'$ are forwarded to the first LMA via a tunnel, and then forwarded to the first PDN.

After a period of time has elapsed, indicated by ellipses, the wireless terminal may be associated with a second PDN. For example, the wireless terminal may request association with a second PDN by transmitting a router solicitation message to the MAG. The router solicitation message may include an APN, such as $APN_2$, to identify the desired PDN.

Alternatively, association with the second PDN may be initiated by the MAG or by a third party. For example, if an entity in the second PDN desires access to the wireless terminal, the MAG may initiate an association with the second PDN. If an address prefix is stored corresponding to the second PDN, a router advertisement message including this address prefix may be transmitted to the wireless terminal.

The MAG then transmits a proxy binding update to a second LMA, $LMA_2$, corresponding to the second PDN. Once a proxy binding acknowledgment is received from $LMA_2$, the MAG may transmit a router advertisement to the wireless terminal. The wireless terminal can then configure this network interface based on the address prefix including the router advertisement message. The wireless terminal will use the address based on the first prefix to communicate with the first PDN and the address based on the second address prefix to communicate with the second PDN.

FIGS. 15A-15B may be adapted for use with stateful address configuration. For example, the MAG may send a router advertisement to the wireless terminal indicating that DHCP is required. Mobility mode information exchange may then be performed using DHCP messages instead of stateless autoconfiguration messages. Similarly, DHCP messages may take the place of router advertisement messages and router solicitation messages. In addition, the MAG may determine full addresses based on address prefixes, and transmit these full addresses to the wireless terminal instead of address prefixes.

Figures 16, 17:
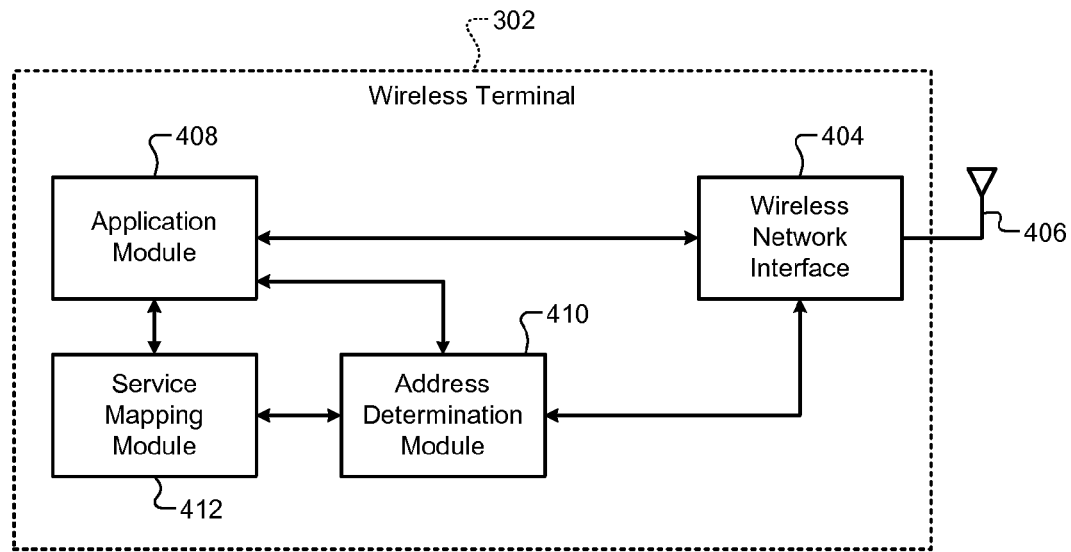
FIG. 16 is a functional block diagram of an exemplary implementation of a wireless terminal that can interface with multiple packet data networks (PDNs) according to the principles of the present disclosure.
FIG. 17 is an exemplary table stored by the wireless terminal mapping services to APNs according to the principles of the present disclosure.

Referring now to FIG. 16, a functional block diagram of an exemplary implementation of the wireless terminal 302 is presented. The wireless terminal 302 includes a wireless network interface 404 that transmits and receives wireless signals using an antenna 406. An application module 408 sends and receives data using the wireless network interface 404. The application module 408 may transmit and receive voice over IP (VoIP) data, text messaging data, push e-mail data, World Wide Web data such as hypertext markup language (HTML) data, etc.

The wireless network interface 404 may maintain multiple IP addresses, one IP address for each PDN with which the wireless terminal 302 is associated. Each PDN may provide one or more of the services used by the application module 408. The application module 408 may specify to the wireless network interface 404 which service to use for any given data or application. The wireless network interface 404 can then use the appropriate IP address for that data or application.

An address determination module 410 configures an address for each PDN with which the wireless network interface 404 communicates. The desired PDNs may be determined based upon the services desired by the application module 408. The application module 408 may consult a service mapping module 412 to determine which PDNs can be used to access the desired services.

The address determination module 410 may also perform client-based mobility functions, such as determining one or more care-of addresses. In addition, the address determination module 410 may help to tunnel packets according to CMIP. For example only, the address determination module 410 may instruct the wireless network interface 404 to encapsulate certain packets being transmitted and decapsulate certain packets being received.

FIG. 17 depicts an exemplary table stored in the service mapping module 412. Each service that the application module 408 requests may be identified by a service identifier. The table may include mappings of service identifiers to PDNs, where each PDN is identified by its APN. In various implementations, a single PDN may provide more than one service.

For purposes of illustration only, when the application module 408 requests service 7 (web browsing), the table in the service mapping module 412 may indicate that the PDN identified by $APN_3$ should be used. The application module 408 and/or the service mapping module 412 may then signal to the address determination module 410 that $APN_3$ is desired.

The address determination module 410 establishes connectivity with the desired APNs. In various implementations, the address determination module 410 may establish connectivity with a set of default APNs. The address determination module 410 may instruct the wireless network interface 404 to transmit router solicitation messages and/or DHCP requests including desired APN information.

When router advertisements and/or DHCP replies are received, the address determination module 410 parses these messages to extract IP address information. The address determination module 410 may form full IP addresses based on prefixes. The address determination module 410 may then indicate to the application module 408 which IP address corresponds to which APN. The application module 408 can then instruct the wireless network interface 404 to use the IP address corresponding to a certain APN for data related to the services provided by that APN.

Figure 18:
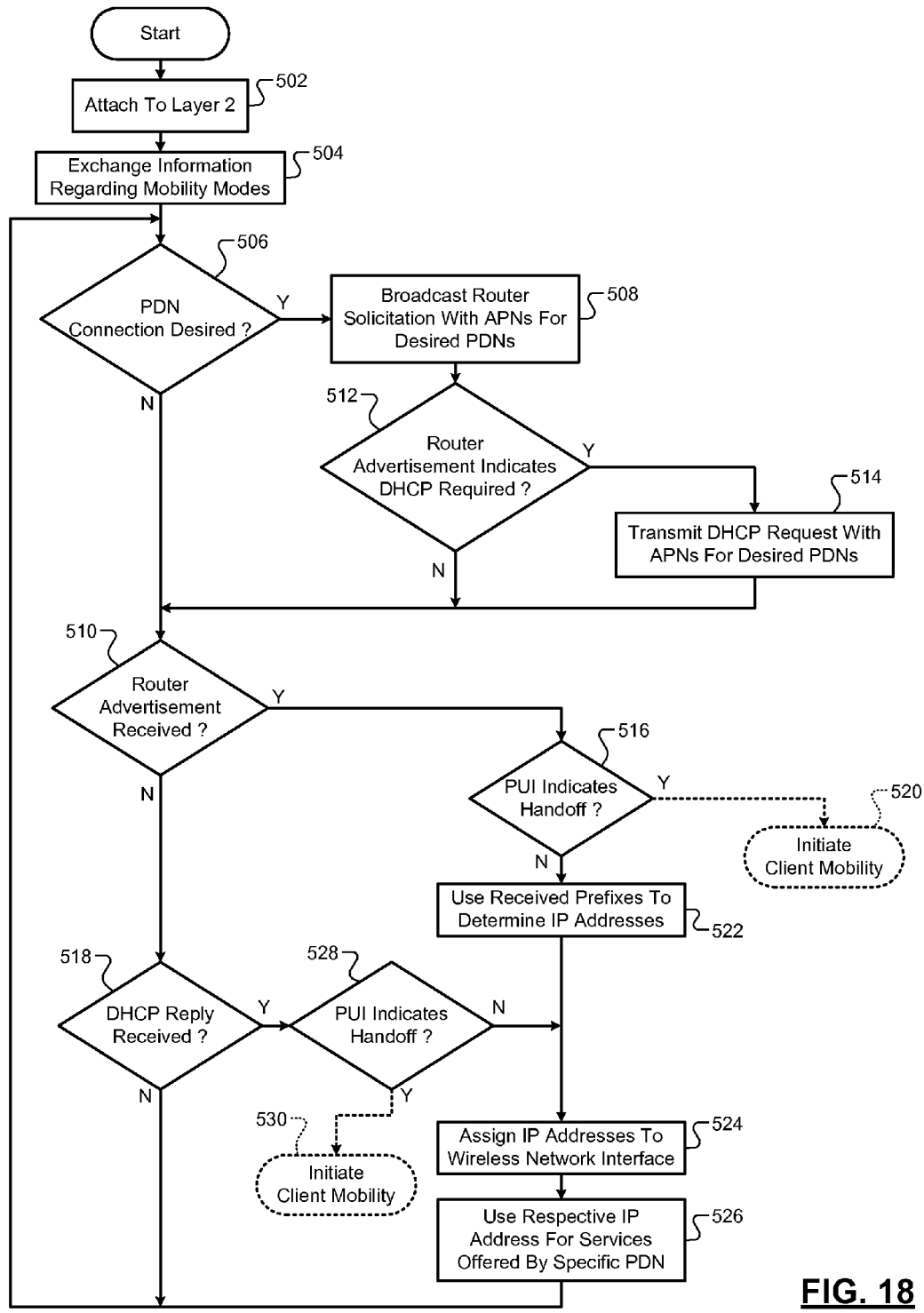
FIG. 18 depicts exemplary steps performed by the wireless terminal according to the principles of the present disclosure.

Referring now to FIG. 18, a flowchart depicts exemplary steps performed by the wireless terminal 302 of FIG. 16. Control begins in step 502, where the wireless terminal attaches to a MAG at layer 2. Control continues in step 504, where the wireless terminal exchanges information regarding mobility modes with the MAG. For purposes of illustration only, it is assumed that the wireless terminal and the MAG decide to use PMIP.

Control continues in step 506, where control determines whether a PDN connection is desired. If so, control transfers to step 508; otherwise, control transfers to step 510. In step 508, control broadcasts a router solicitation message. The router solicitation message may include APNs for the one or more PDNs that the wireless terminal desires to be connected with. Control continues in step 512.

In step 512, control determines whether a received router advertisement indicates that DHCP is required. If so, control transfers to step 514; otherwise, control transfers to step 510. In step 514, control transmits a DHCP request to the MAG. The DHCP request may include APN for the desired PDN. Control then continues in step 510.

In step 510, control determines whether a router advertisement message has been received. If so, control transfers to step 516; otherwise, control transfers to step 518. In step 516, control determines whether a prefix usage indicator (PUI) in the router advertisement message indicates that a handoff has occurred. If so, control transfers to step 520; otherwise, control transfers to step 522.

In step 520, the wireless terminal may initiate client mobility to preserve session continuity through the handoff. In various implementations, if client mobility does not succeed, control may then continue in step 522. In step 522, control uses received address prefixes to determine IP addresses for the wireless network interface. The PUI may indicate which of the address prefixes should be used as home addresses for the wireless network interface.

Control then continues in step 524. In step 524, control assigns IP addresses to the wireless network interface. In various implementations, the PUI may determine which IP addresses are assigned as PMIP home addresses and which IP addresses are used as care-of addresses. Control continues in step 526, where the wireless terminal uses the respective IP address for services offered by a particular PDN. Control then returns to step 506.

In step 518, control determines whether a DHCP reply has been received. If so, control transfers to step 528. In step 528, control determines whether a PUI included in the DHCP reply indicates that a handoff has occurred. If so, control may initiate client mobility in step 530; otherwise, control transfers to step 524.

Figure 19:
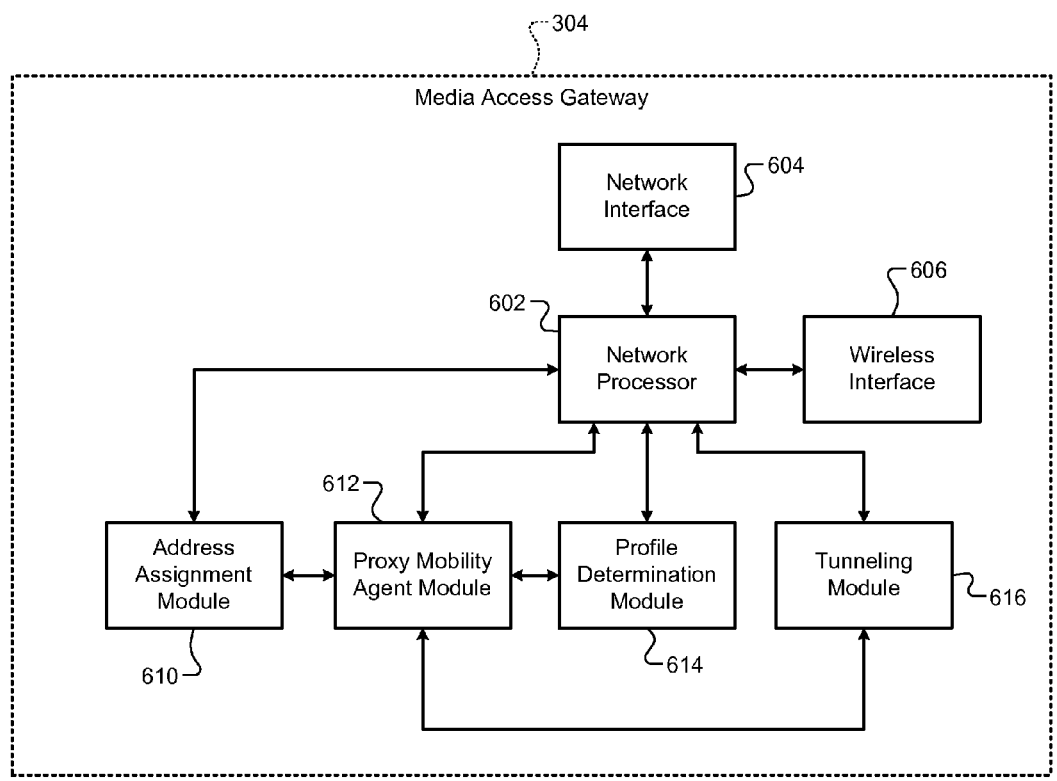
FIG. 19 is a functional block diagram of an exemplary media access gateway (MAG) that supports binding of a wireless terminal to multiple packet data networks according to the principles of the present disclosure.

Referring now to FIG. 19, a functional block diagram of an exemplary implementation of the MAG 304 is presented. The MAG 304 includes a network processor 602 that communicates with one or more PDNs via a network interface 604. A wireless interface 606 communicates with a wireless terminal. In various implementations, the wireless interface 606 may support a single access type, such as Wi-Fi (IEEE 802.11) or a third generation partnership project (3GPP) interface.

The MAG 304 also includes an address assignment module 610, a proxy mobility agent (PMA) module 612, a profile determination module 614, and a tunneling module 616, which communicate with the network processor 602. The address assignment module 610 processes DHCP requests and router solicitation messages. The address assignment module 610 may extract APN information from extended DHCP requests and extended router solicitation messages. This APN information is provided to the PMA module 612.

The profile determination module 614 obtains the profile corresponding to the wireless terminal connected to the wireless interface 606. For example only, the profile may be obtained via the network interface 604 from a home subscriber server (HSS). The profile determination module 614 extracts APN information from the profile and passes the information to the PMA module 612.

The PMA module 612 determines a selected set of APNs based on APNs received from the address assignment module 610 and the profile determination module 614. The PMA module 612 may refine and/or expand this selected set based on local policy information and/or agreements with a home network of the wireless terminal.

The PMA module 612 establishes proxy mobility with LMAs corresponding to the selected set of APNs. The addresses for these LMAs may be provided by the profile determination module 614. The PMA module 612 establishes tunnels to each of the LMAs using the tunneling module 616. The tunneling module 616 encapsulates packets received via the wireless interface 606 for transmission to the LMAs. The tunneling module 616 also decapsulates packets received from the network interface 604 for broadcast to the wireless terminal via the wireless interface 606.

The PMA module 612 may perform mobility mode information exchange with a wireless terminal connected to the wireless interface 606. IN addition, the PMA module 612 may determine one or more prefix usage indicators (PUI) for inclusion in address configuration messages sent by the address assignment module 610. The PMA module 612 may also store binding information for each PMIP connection of the attached wireless terminal, such as is shown in FIG. 12.

The PMA module 612 provides address information corresponding to the selected APNs to the address assignment module 610. In addition, the address assignment module 610 may receive address information stored in the profile from the profile determination module 614. The address assignment module 610 generates address configuration messages, such as DHCP reply and/or router advertisement messages, that include address information.

APN information may be included in the address configuration messages to identify the APN to which each address corresponds. The address assignment module 610 may also determine full IP addresses based on address prefix information. The address assignment module 610 may include full addresses and/or address prefixes in the address configuration messages.

Figure 20:
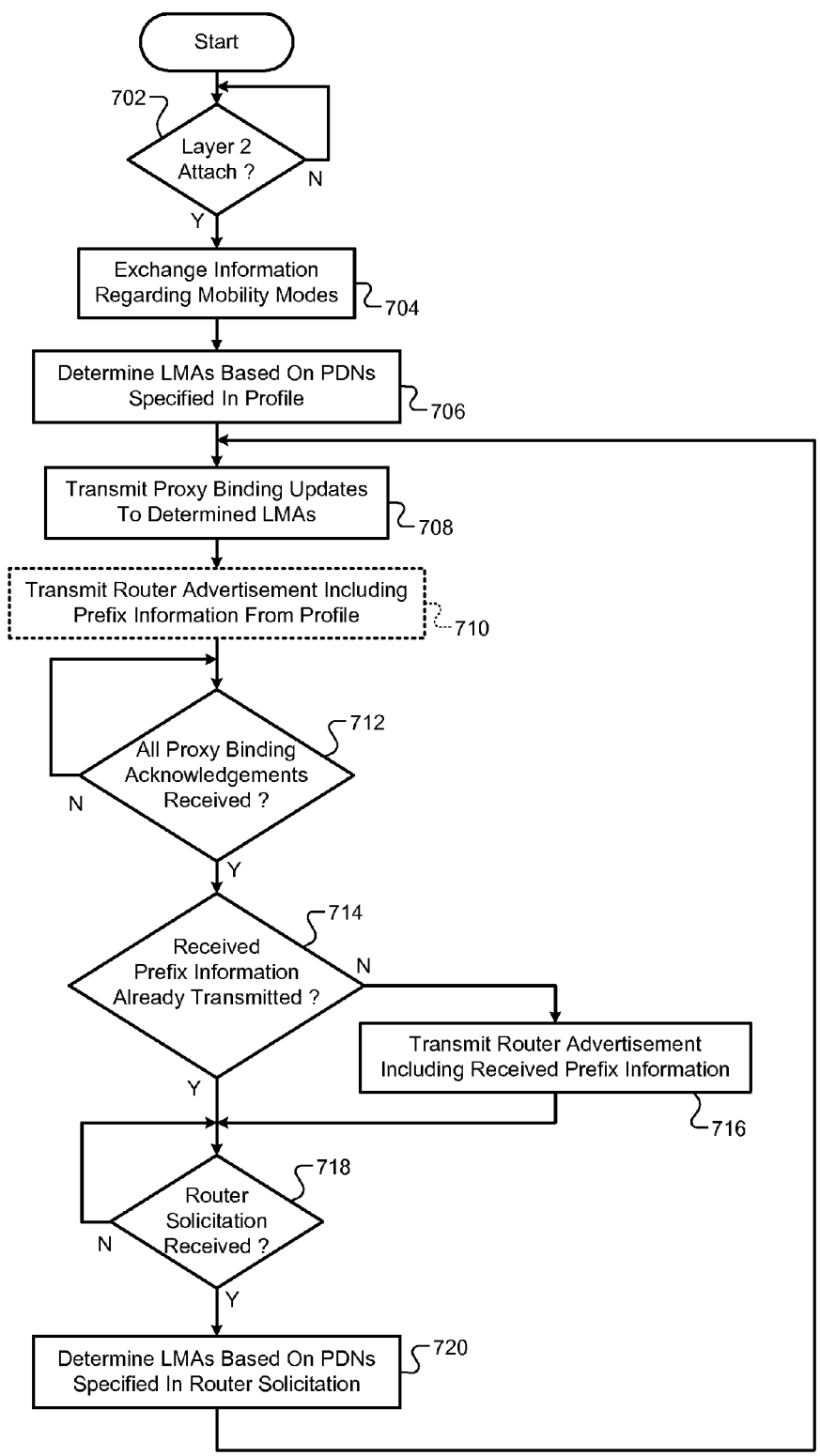
FIG. 20 depicts exemplary steps performed by the MAG according to the principles of the present disclosure.

Referring now to FIG. 20, control determines whether a wireless has attached to the MAG. Once a layer 2 attachment has been made with the MAG, control transfers to step 704. In step 704, the MAG optionally exchanges information regarding mobility modes with the wireless terminal. Control continues in step 706, where control determines LMAs based on PDNs specified in a profile corresponding to the wireless terminal. The profile may be received from an HSS or an AAA server. Alternatively, control may determine LMAs based on PDNs provided in a message from the wireless terminal, such as an address configuration message.

Control continues in step 708, where control transmits proxy binding updates to the determined LMAs. Control continues in step 710, where control optionally transmits a router advertisement including prefix information obtained from the profile. Control continues in step 712, where control waits for all proxy binding acknowledgments to be received. Once all proxy binding acknowledgments have been received, control transfers to step 714.

In step 714, control determines whether prefix information received in the proxy binding acknowledgments has already been sent to the wireless terminal. If not, control transfers to step 716; otherwise, control transfers to step 718. In step 716, control transmits a message, such as a router advertisement message, including the received prefix information to the wireless terminal.

The router advertisement message may include a PUI indicating that the included address prefixes should be configured as home address prefixes for PMIP. In addition, if a router advertisement has already been sent in step 710, the PUI may indicate that the new address prefixes are replacements and are not the result of a handoff. Control then continues in step 718. Control remains in step 718 until a router solicitation message has been received, at which point control transfers to step 720. In step 720, control determines LMAs based on the PDNs specified in the router solicitation message. Control then returns to step 708.

Figure 21:
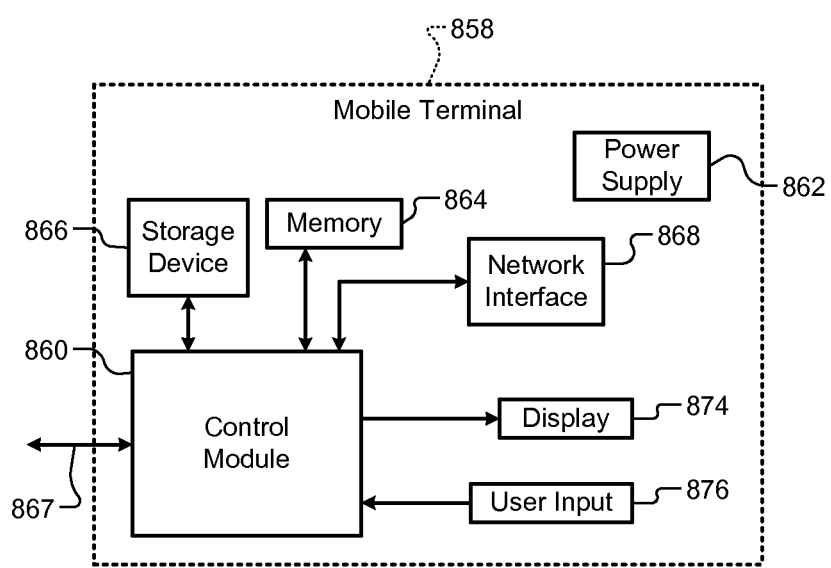
FIG. 21 is a functional block diagram of a mobile terminal according to the principles of the present disclosure.

Referring now to FIG. 21, the teachings of the disclosure can be implemented in a control module 860 of a mobile terminal 858. The mobile terminal 858 includes the control module 860, a power supply 862, memory 864, a storage device 866, and a wireless network interface 867. The mobile terminal 858 may optionally include a network interface 868, a microphone, an audio output such as a speaker and/or output jack, a display 874, and a user input device 876 such as a keypad and/or pointing device. If the network interface 868 includes a wireless local area network interface, an antenna (not shown) may be included.

The control module 860 may receive input signals from the wireless network interface 867, the network interface 868, the microphone, and/or the user input device 876. The control module 860 may process signals, including encoding, decoding, filtering, and/or formatting, and generate output signals. The output signals may be communicated to one or more of memory 864, the storage device 866, the wireless network interface 867, the network interface 868, and the audio output.

Memory 864 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 866 may include an optical storage drive, such as a DVD drive, and/or a hard disk drive (HDD). The power supply 862 provides power to the components of the mobile terminal 858. The teachings of the disclosure can be implemented similarly in other devices such as a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:
1. A networking device comprising:
a wireless network interface configured to establish a wireless link with a wireless client terminal;
a tunneling circuit configured to
establish a first tunnel with a first local mobility anchor, wherein the first local mobility anchor is associated with a first packet data network, and
establish a second tunnel with a second local mobility anchor, wherein the second local mobility anchor is associated with a second packet data network; and
a mobility agent circuit configured to
store a mapping of a plurality of addresses respectively assigned to local mobility anchors, wherein the mapping of the plurality of addresses assigned to local mobility anchors includes (i) a first mapping that maps a first address of the plurality of addresses to the first local mobility anchor, and (ii) a second mapping that maps a second address of the plurality of addresses to the second local mobility anchor, and
in response to receiving a first packet from the wireless client terminal, identify, based on a source address of the first packet, a selected local mobility anchor from the mapping of the plurality of addresses,
wherein the first local mobility anchor is identified from the first mapping as the selected local mobility anchor in response to the source address of the first packet matching the first address, and wherein the second local mobility anchor is identified from the second mapping as the selected local mobility anchor in response to the source address of the first packet matching the second address, wherein the tunneling circuit is configured to tunnel the first packet from the networking device to the selected local mobility anchor.

2. The networking device of claim 1, wherein the networking device comprises a media access gateway.

3. The networking device of claim 1, wherein the mobility agent circuit comprises a proxy mobility agent.

4. The networking device of claim 1, wherein the tunneling circuit is configured to:
in response to receiving a second packet from the first local mobility anchor through the first tunnel, forward the second packet to the wireless client terminal, and
in response to receiving a third packet from the second local mobility anchor through the second tunnel, forward the third packet to the wireless client terminal.

5. The networking device of claim 1, further comprising an address assignment circuit configured to transmit an address assignment message to the wireless client terminal, wherein:
the address assignment message includes a first address data element and a second address data element;
the wireless client terminal determines the first address based on the first address data element; and
the wireless client terminal determines the second address based on the second address data element.

6. The networking device of claim 5, wherein the first address data element includes an internet protocol address, and wherein the first address is set equal to the internet protocol address of the first address data element.

7. The networking device of claim 5, wherein the first address data element includes an internet protocol address prefix, and wherein the wireless client terminal determines the first address based on the internet protocol address prefix.

8. The networking device of claim 5, wherein:
the address assignment message includes a prefix usage indicator;
the address assignment circuit is configured to, in response to the first address being a network-based mobility address, set the prefix usage indicator to a first state; and
the address assignment circuit is configured to, in response to the first address being a client-based mobility address, set the prefix usage indicator to a second state.

9. The networking device of claim 8, wherein the address assignment circuit is configured to set the prefix usage indicator to the second state in response to the first address having been generated based on a handoff.

10. The networking device of claim 8, wherein:
the address assignment message includes a plurality of address data elements including the first address data element and the second address data element;
the plurality of address data elements includes zero or more network-based mobility address data elements and zero or more client-based mobility address data elements; and
the prefix usage indicator indicates (i) which of the plurality of address data elements are network-based mobility address data elements, and (ii) which of the plurality of address data elements are client-based mobility address data elements.

11. The networking device of claim 5, wherein:
the address assignment circuit is configured to receive a request message from the wireless client terminal including a list of requested packet data networks.

12. The networking device of claim 11, wherein:
the address assignment message includes a plurality of address data elements including the first address data element and the second address data element; and
an order of the plurality of address data elements in the address assignment message matches an order of the requested packet data networks in the request message.

13. A communications system, comprising:
the networking device of claim 1; and
the wireless client terminal, wherein the wireless client terminal is configured to
use the first address as the source address of the first packet in order to send the first packet to the first packet data network, and
use the second address as the source address of the first packet in order to send the first packet to the second packet data network.

14. A method of operating a networking device, the method comprising:
establishing a wireless link with a wireless client terminal;
establishing a first tunnel with a first local mobility anchor, wherein the first local mobility anchor is associated with a first packet data network;
establishing a second tunnel with a second local mobility anchor, wherein the second local mobility anchor is associated with a second packet data network;
storing a mapping of a plurality of addresses respectively assigned to local mobility anchors, wherein the mapping of the plurality of addresses assigned to local mobility anchors includes (i) a first mapping that maps a first address of the plurality of addresses to the first local mobility anchor, and (ii) a second mapping that maps a second address of the plurality of addresses to the second local mobility anchor;
in response to receiving a first packet from the wireless client terminal, identifying, based on a source address of the first packet, a selected local mobility anchor from the mapping of the plurality of addresses, wherein
the first local mobility anchor is identified from the first mapping as the selected local mobility anchor in response to the source address of the first packet matching the first address, and
the second local mobility anchor is identified from the second mapping as the selected local mobility anchor in response to the source address of the first packet matching the second address; and
tunneling the first packet from the networking device to the selected local mobility anchor.

15. The method of claim 14, further comprising:
in response to receiving a second packet from the first local mobility anchor through the first tunnel, forwarding the second packet to the wireless client terminal; and
in response to receiving a third packet from the second local mobility anchor through the second tunnel, forwarding the third packet to the wireless client terminal.

16. The method of claim 14, further comprising transmitting an address assignment message to the wireless client terminal, wherein:
the address assignment message includes a first address data element and a second address data element;
the wireless client terminal determines the first address based on the first address data element; and
the wireless client terminal determines the second address based on the second address data element.

17. The method of claim 16, wherein the first address data element includes an internet protocol address, and wherein the first address is set equal to the internet protocol address of the first address data element.

18. The method of claim 16, wherein the first address data element includes an internet protocol address prefix, and wherein the wireless client terminal determines the first address based on the internet protocol address prefix.

19. The method of claim 16, wherein the address assignment message includes a prefix usage indicator, and wherein the method further comprises:
   in response to the first address being a network-based mobility address, setting the prefix usage indicator to a first state; and
   in response to the first address being a client-based mobility address, setting the prefix usage indicator to a second state.

20. The method of claim 19, further comprising setting the prefix usage indicator to the second state in response to the first address having been generated based on a handoff.

21. The method of claim 19, wherein:
   the address assignment message includes a plurality of address data elements including the first address data element and the second address data element;
   the plurality of address data elements includes zero or more network-based mobility address data elements and zero or more client-based mobility address data elements; and
   the prefix usage indicator indicates (i) which of the plurality of address data elements are network-based mobility address data elements, and (ii) which of the plurality of address data elements are client-based mobility address data elements.

22. The method of claim 16, further comprising receiving a request message from the wireless client terminal including a list of requested packet data networks, wherein:
   the address assignment message includes a plurality of address data elements including the first address data element and the second address data element; and
   an order of the plurality of address data elements in the address assignment message matches an order of the requested packet data networks in the request message.

23. The method of claim 14, further comprising:
   setting the first address as the source address of the first packet in order to send the first packet to the first packet data network; and
   setting the second address as the source address of the first packet in order to send the first packet to the second packet data network.

\* \* \* \* \*